United States Patent
Lee et al.

(10) Patent No.: US 11,483,734 B2
(45) Date of Patent: Oct. 25, 2022

(54) APPARATUS AND METHOD FOR PROVIDING DIRECT COMMUNICATION SERVICES IN WIRELESS COMMUNICATION SYSTEM

(71) Applicant: Samsung Electronics Co., Ltd., Suwon-si (KR)

(72) Inventors: Hoyeon Lee, Suwon-si (KR); Sunghoon Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/856,491

(22) Filed: Apr. 23, 2020

(65) Prior Publication Data

US 2020/0344636 A1 Oct. 29, 2020

(30) Foreign Application Priority Data

Apr. 23, 2019 (KR) .................. 10-2019-0047280
May 2, 2019 (KR) .................. 10-2019-0051783

(51) Int. Cl.
*H04W 28/02* (2009.01)
*H04W 80/12* (2009.01)
(Continued)

(52) U.S. Cl.
CPC ......... *H04W 28/0268* (2013.01); *H04W 4/40* (2018.02); *H04W 76/11* (2018.02);
(Continued)

(58) Field of Classification Search
CPC . H04W 28/0268; H04W 76/11; H04W 76/14; H04W 4/40; H04W 80/02;
(Continued)

(56) References Cited

U.S. PATENT DOCUMENTS

2016/0105880 A1    4/2016   Bao et al.
2016/0212108 A1    7/2016   Stojanovski et al.
(Continued)

FOREIGN PATENT DOCUMENTS

CN    107113898 A    8/2017
CN    107645710 A    1/2018
(Continued)

OTHER PUBLICATIONS

3GPP TS 23.287 V0.3.0 (Apr. 16, 2019) (Year: 2019).*
(Continued)

*Primary Examiner* — Mandish K Randhawa
(74) *Attorney, Agent, or Firm* — Jefferson IP Law, LLP

(57) ABSTRACT

The disclosure relates to a communication technique for combining, with IoT technology, a 5G communication system for supporting a data transmission rate higher than that of a 4G system, and to a system therefor. The disclosure may be applied to intelligent services (e.g., a smart home, a smart building, a smart city, a smart car or connected car, healthcare, digital education, retail business, security and safety-related service, etc.), based on a $5^{th}$ generation (5G) communication technology and an Internet of Things (IoT)-related technology. The disclosure discloses a method and an apparatus for providing direct communication services.

20 Claims, 17 Drawing Sheets

(51) Int. Cl.
  *H04W 76/11* (2018.01)
  *H04W 4/40* (2018.01)
  *H04W 80/02* (2009.01)
  *H04W 92/18* (2009.01)
(52) U.S. Cl.
  CPC .......... *H04W 80/02* (2013.01); *H04W 80/12* (2013.01); *H04W 92/18* (2013.01)
(58) Field of Classification Search
  CPC ....... H04W 80/12; H04W 92/18; H04W 4/70; H04W 84/005
  See application file for complete search history.

(56) References Cited

U.S. PATENT DOCUMENTS

2019/0124015 A1  4/2019  Loehr et al.
2020/0229249 A1* 7/2020  Cheng ................... H04W 76/14

FOREIGN PATENT DOCUMENTS

| CN | 107995605 A | 5/2018 |
| GB | 2518347 A | 3/2015 |
| WO | 2018/016157 A1 | 1/2018 |
| WO | 2018/125686 A2 | 7/2018 |
| WO | 2018/236736 A1 | 12/2018 |

OTHER PUBLICATIONS

3GPP; TSG SA; Architecture enhancements for 5G System (5GS) to support Vehicle-to-Everything (V2X) services (Release 16)', 3GPP TS 23 287 VO 3.0, Apr. 16, 2019, sections 5 2.1.4, 6.3 3.1; and figure 6.3.3 1-1.
3GPP; TSG SA; Study on architecture enhancements for the Evolved Packet System (EPS) and the 5G System (5GS) to support advanced V2X services (Release 16), 3GPP TR 23.786 V16.0.0, Mar. 28, 2019, sections 6.11.2-6.11.3.
Samsung, 'PC5 unicast', S2-1903245, SA WG2 Meeting #132, Xi'an, China, Apr. 2, 2019.
3GPP; TSG SA; Proximity-based services (ProSe); Stage 2 (Release 15), 3GPP TS 23.303 V15.1.0, Jun. 19, 2018.
International Search Report dated Jul. 31, 2020, issued in International Patent Application No. PCT/KR2020/005394.
Chinese Office Action dated Feb. 14, 2022, issued in a counterpart Chinese Application No. 202080030621.8.
Ndian Office Action dated Apr. 8, 2022, issued in a counterpart Indian Application No. 202117046843.
Extended European Search Report dated May 4, 2022, issued in a counterpart European Application No. 20794955.3.
LG Electronics et al.; "TS 23.287 Procedure for PCS unicast"; SA WG2 Meeting #132; S2-1903306, (revision of S2-19xxxxx); Apr. 2, 2019, Xi'an, China.
CATT; "TS 23 287 PC5 QoS handling for unicast, groupcast and broadcast"; Sa WG2 Meeting #131; S2-1901913, (revision of S2-19xxxxx); Feb. 19, 2019, Tenerife, Spain.
Qualcomm Incorporated; "Unicast and multicast V2X communication support over PC5"; SA WG2 Meeting #126; S2-183620, (revision of S2-18xxxx); Apr. 9, 2018, Sanya, P.R. China.

* cited by examiner

APPARATUS AND METHOD FOR PROVIDING DIRECT COMMUNICATION SERVICES IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0047280, filed on Apr. 23, 2019, in the Korean Intellectual Property Office, and of a Korean patent application number 10-2019-0051783, filed on May 2, 2019, in the Korean Intellectual Property Office, the disclosure of each of which is incorporated by reference herein in its entirety.

BACKGROUND

1 Field

The disclosure relates to an apparatus and a method for providing direct communication services in a wireless communication system.

2 Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long-term evolution (LTE) System".

The 5G communication system is considered to be implemented in higher frequency millimeter Wave (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Vehicle-to-everything (V2X) is a generic term that refers to all types of communication methods applicable to road vehicles and enables various additional services, as well as safety use cases in the early stage, in combination with the development of wireless communication technology.

Wireless access in vehicular environments (WAVE) standards based on IEEE 802.11p and IEEE P1609 have been established as a technique for providing V2X services. However, WAVE, which is a kind of dedicated short range communication (DSRC) technology, has a limitation in that a message transmission distance between vehicles is limited.

In order to overcome the above limitation, standardization of cellular-based V2X technology is underway in 3GPP. LTE system-based evolved packet system (EPS) V2X standards have been established in Release 14/Release 15, and the establishment of 5th generation system (5GS) V2X standards based on NR system is in progress in Release 16.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for providing direct communication services in a wireless communication system In order to address the above issues, the disclosure provides a method for processing control signals in a wireless communication system, which includes receiving a first control signal transmitted from a base station, processing the received first control signal, and transmitting, to the base station, a second control signal produced based on the processing.

In accordance with an aspect of the disclosure, a method performed by a first terminal in a wireless communication system is provided. The method includes establishing a unicast link with a second terminal, wherein the unicast link supports one or more service types associated with a first pair of application layer identifiers (IDs) of the first terminal and the second terminal, in case that a data transfer for a service is initiated, determining whether to reuse the established unicast link based on a second pair of application layer IDs associated with the service, and modifying the established unicast link for the service to reuse the established unicast link, in case that the second pair of application layer IDs associated with the service is identical to the first pair of application IDs of the first terminal and the second terminal.

In accordance with another aspect of the disclosure, a method performed by a second terminal in a wireless communication system is provided. The method includes establishing a unicast link with a first terminal, wherein the unicast link supports one or more service types associated with a first pair of application layer IDs of the first terminal and the second terminal, and modifying the established unicast link to reuse the established unicast link, in case that a data transfer for a service is initiated, wherein the established unicast link is determined to be reused, in case that the second pair of application layer IDs associated with the service is identical to the first pair of application IDs of the first terminal and the second terminal.

In accordance with another aspect of the disclosure, a first terminal in a wireless communication system is provided. The first terminal includes a transceiver configured to transmit and receive signals, and at least one processor coupled with the transceiver and configured to establish a unicast link with a second terminal, wherein the unicast link supports one or more service types associated with a first pair of application layer IDs of the first terminal and the second terminal, in case that a data transfer for a service is initiated, determine whether to reuse the established unicast link based on a second pair of application layer IDs associated with the service, and modify the established unicast link for the service to reuse the established unicast link, in case that the second pair of application layer IDs associated with the service is identical to the first pair of application layer IDs of the first terminal and the second terminal.

In accordance with another aspect of the disclosure, a second terminal in a wireless communication system is provided. The second terminal includes a transceiver configured to transmit and receive signals, and at least one processor coupled with the transceiver and configured to establish a unicast link with a first terminal, wherein the unicast link supports one or more service types associated with a first pair of application layer IDs of the first terminal and the second terminal, and modify the established unicast link to reuse the established unicast link, in case that a data transfer for a service is initiated, wherein the established unicast link is determined to be reused, in case that the second pair of application layer IDs associated with the service is identical to the first pair of application IDs of the first terminal and the second terminal.

Additional aspects will be set forth in part in the description which follows and, in part, will be apparent from the description, or may be learned by practice of the presented embodiments.

In accordance with an aspect of the disclosure, an apparatus and a method capable of efficiently providing direct communication services in a wireless communication system is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

For a more complete understanding of the disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
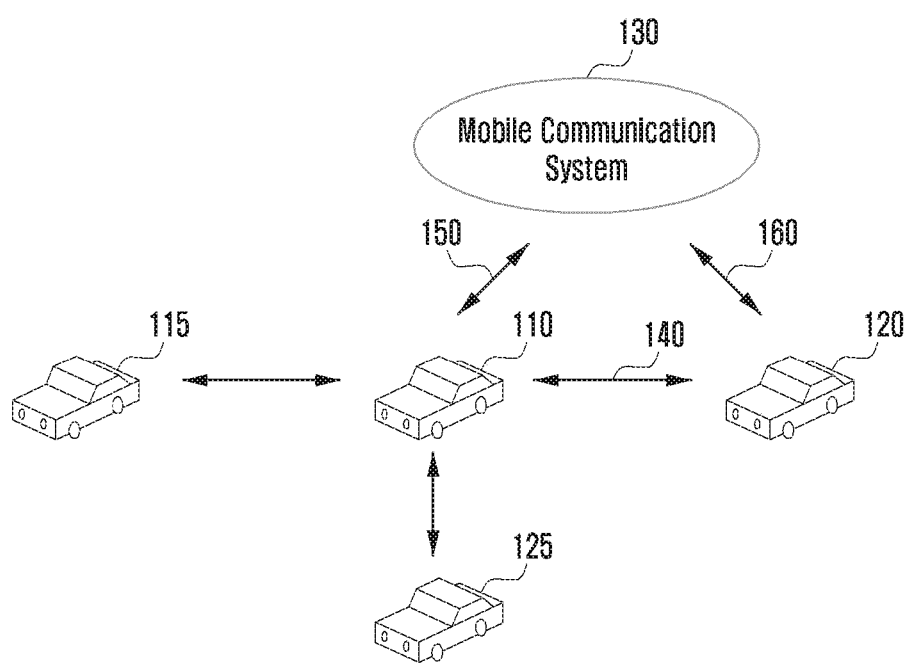
FIG. 1 illustrates a configuration of a vehicle communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the operation principle of the disclosure will be described below in conjunction with the accompanying drawings. In the following description of the disclosure, a detailed description of known functions or configurations incorporated herein will be omitted when it may make the subject matter of the disclosure rather unclear. The terms which will be described below are terms defined based on the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in the 5G, new radio (NR), and long term evolution (LTE) system standards for the convenience of description. However, the disclosure is not limited by these terms and names, and may be applied in the same way to systems that conform other standards.

A detailed description of embodiments of the disclosure will be directed to communication standards defined by the 3GPP. However, based on determinations by those skilled in the art, the main idea of the disclosure may be applied to other communication systems having similar technical backgrounds through some changes and modifications without significantly departing from the scope of the disclosure.

Although embodiments of the disclosure will be described below, based primarily on vehicle communication services, the subject matter of the disclosure may be applied to other services provided in a 5G network through some modifications thereof without departing from the scope of the disclosure, which may be readily determined by those skilled in the art.

In a 5G system, more various services than an existing 4G system are considered to be supported. For example, the most typical services may include enhanced mobile broadband (eMBB), ultra-reliable and low-latency communication (URLLC), massive machine-type communication (mMTC), an evolved multimedia broadcast/multicast service (eMBMS), and the like. In addition, a system that provides URLLC services may be referred to as a "URLLC system", and a system that provides eMBB services may be referred to as an "eMBB system". Further, "service" may be used interchangeably with "system".

Among them, the URLLC services are newly considered in the 5G system, unlike the existing 4G system, and satisfy conditions of ultra-reliability (for example, a packet error rate of about $10^{-5}$) and low latency (for example, about 0.5 msec), compared to other services. In order to satisfy these strict requirements, the URLLC service may need to apply a transmission time interval (TTI) shorter than that of the eMBB service, and various operation methods utilizing the same are being considered.

Meanwhile, the Internet, which to date has been a human-centered connectivity network in which humans generate and consume information, is now evolving to the Internet of Things (IoT), where distributed entities, or "things", exchange and process information. The Internet of Everything (IoE), which is a combination of IoT technology and big-data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine-type communication (MTC), and the like, have been recently researched.

FIG. 1 illustrates a configuration of a vehicle communication system according to an embodiment of the disclosure.

Referring to FIG. 1, a terminal 110 (this may be used interchangeably with a user equipment, a user terminal, or a vehicle UE) may use direct communication 140 (e.g., device-to-device (D2D), ProSe, PC5, or sidelink communication) or network communication 150 or 160 through a mobile communication system 130 in order to communicate with another terminal 120. In the case of direct communication, the transmission and reception of messages between the terminal 110 and another terminal 120 may be performed through a PC5 link. In the case of network communication, a message sent from a transmitting vehicle terminal to a receiving vehicle terminal may be transmitted to a network through a Uu link, and may then be transmitted to the receiving vehicle terminal through a Uu link. The mobile communication system 130 may be an EPC system defined in 3GPP, a 5GC system, or a communication system other than 3GPP. The direct communication 140 may be provided using a non-3gpp RAT, such as LTE radio access technology (RAT), NR RAT, or wireless fidelity (Wi-Fi).

Figure 2A:
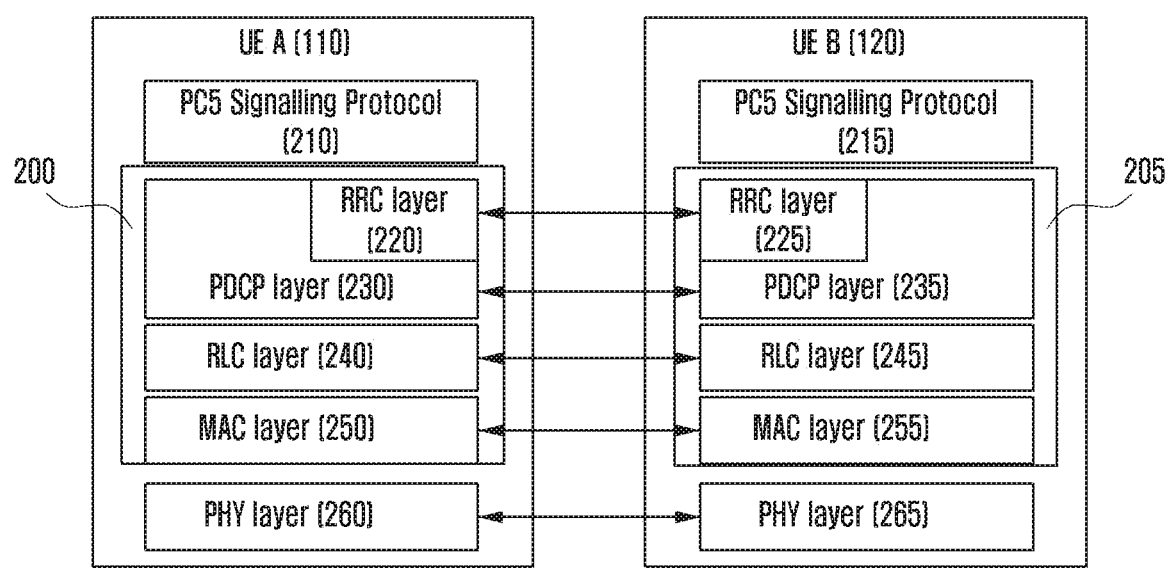
FIG. 2A illustrates a control plane protocol stack of a terminal according to an embodiment of the disclosure.
Figure 2B:
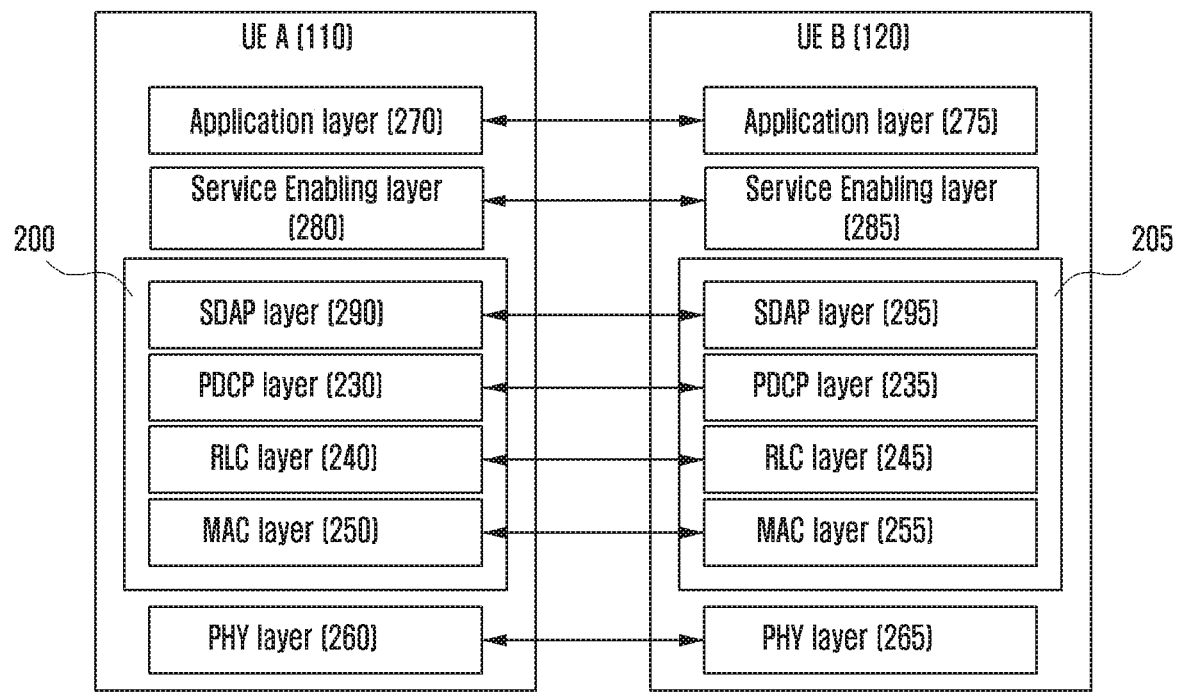
FIG. 2B illustrates a user plane protocol stack of a terminal according to an embodiment of the disclosure.

FIG. 2A illustrates a control plane protocol stack of a terminal according to an embodiment of the disclosure, and FIG. 2B illustrates a user plane protocol stack of a terminal according to an embodiment of the disclosure. A terminal 110 may be a transmitting terminal, and a terminal 120 may be a receiving terminal, which will be referred to as a "terminal 110" and a "terminal 120", respectively, for the convenience of description.

Referring to FIG. 2A, the control plane protocol stack of the terminal 110 or 120 may include a PC5 signaling protocol layer 210 or 215, a radio resource control (RRC) layer 220 or 225, a packet data convergence protocol (PDCP) layer 230 or 235, a radio link control (RLC) layer 240 or 245, a MAC layer 250 or 255, and a physical layer (PHY) layer 260 or 265. The RRC layer 220 or 225, the PDCP layer 230 or 235, the RLC layer 240 or 245, and the medium access control (MAC) layer 250 or 255 may be collectively referred to as an access stratum (AS) layer 200 or 205. Hereinafter, in describing the disclosure, the AS layer 200 or 205 may include at least one of the RRC layer 220 or 225, the PDCP layer 230 or 235, the RLC layer 240 or 245, and the MAC layer 250 or 255.

Figure 4A:
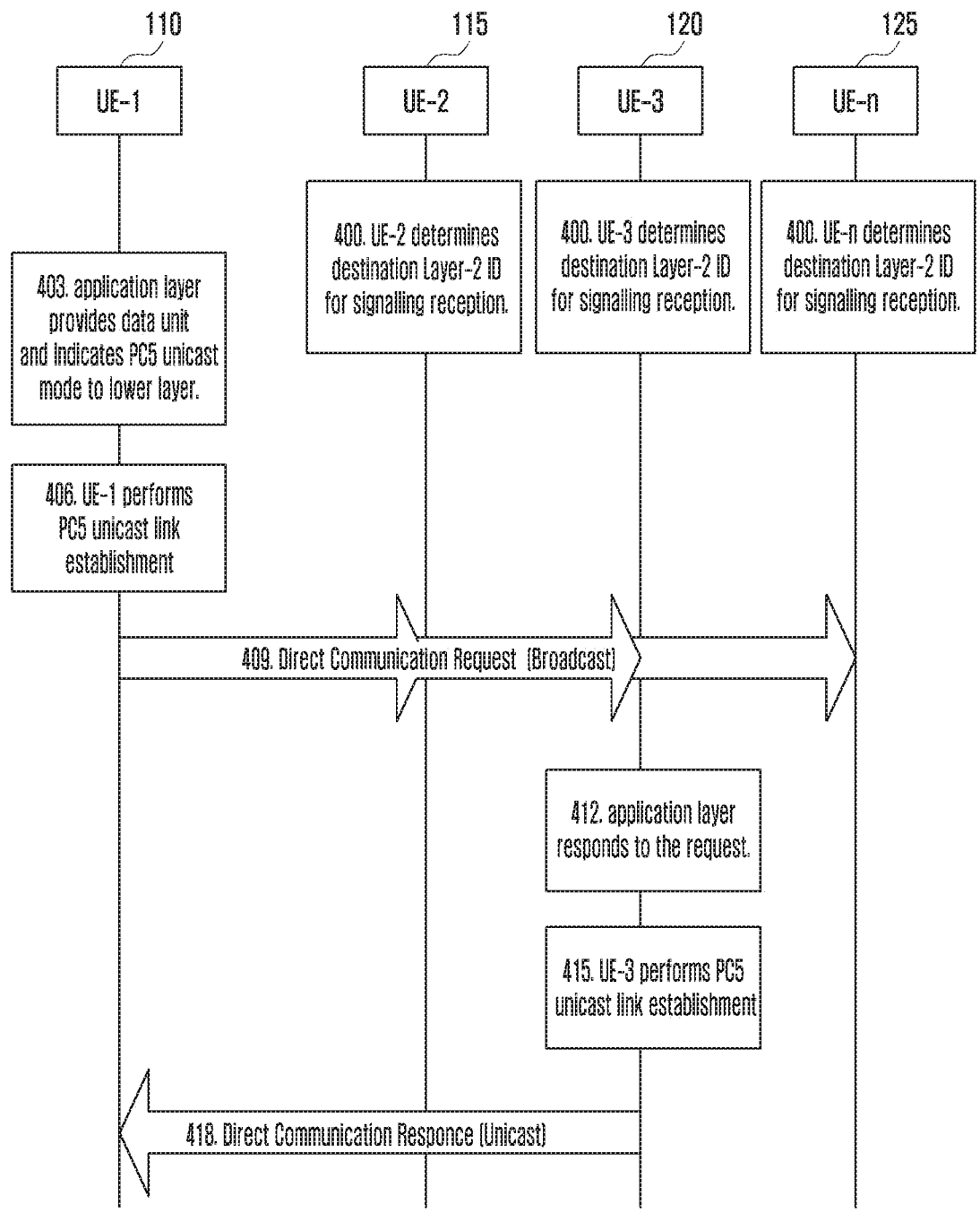
FIG. 4A illustrates a procedure of establishing a direct communication link according to an embodiment of the disclosure.
Figure 4B:
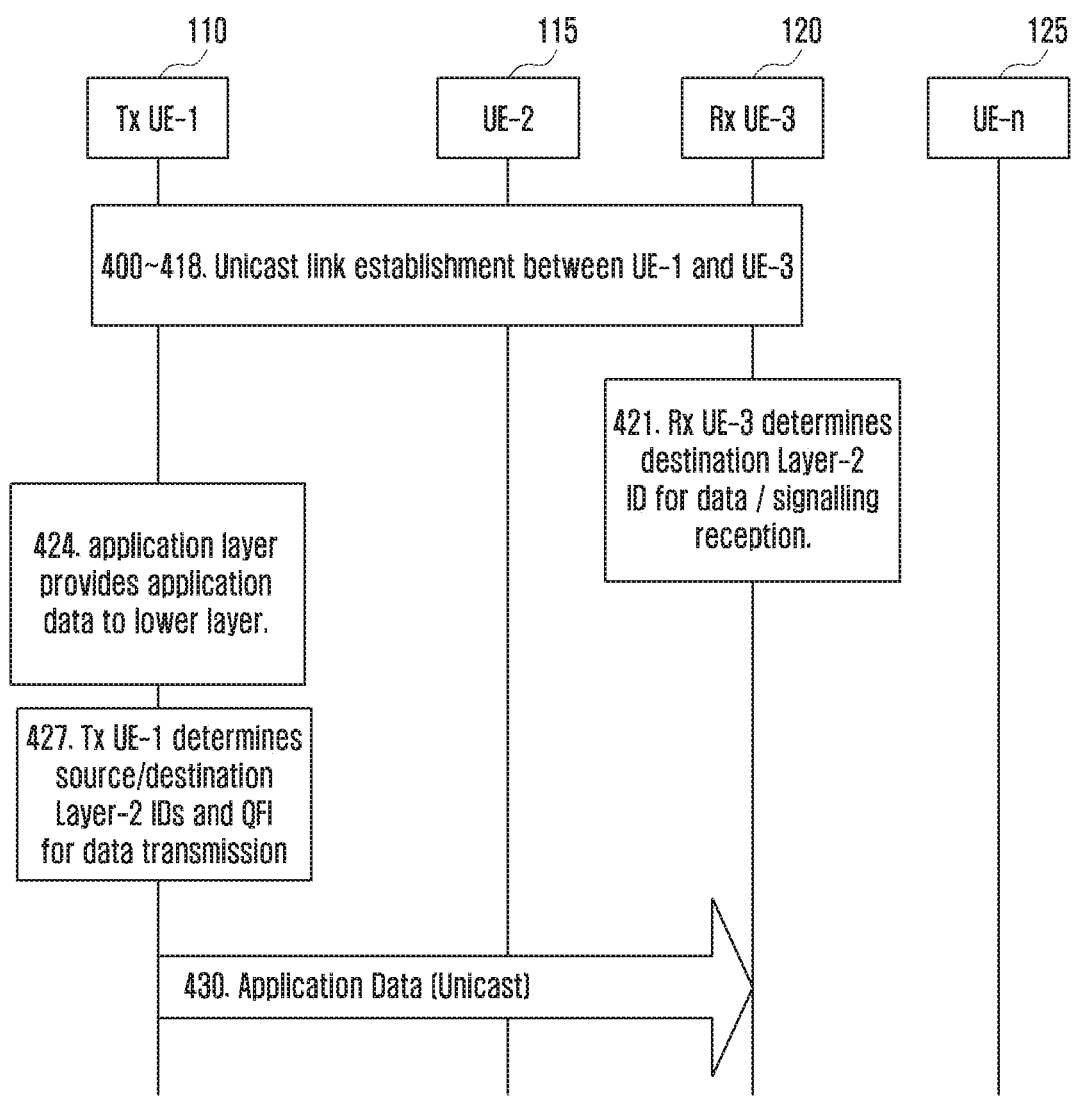
FIG. 4B illustrates a procedure of transmitting data using a direct communication link according to an embodiment of the disclosure.
Figure 4C:
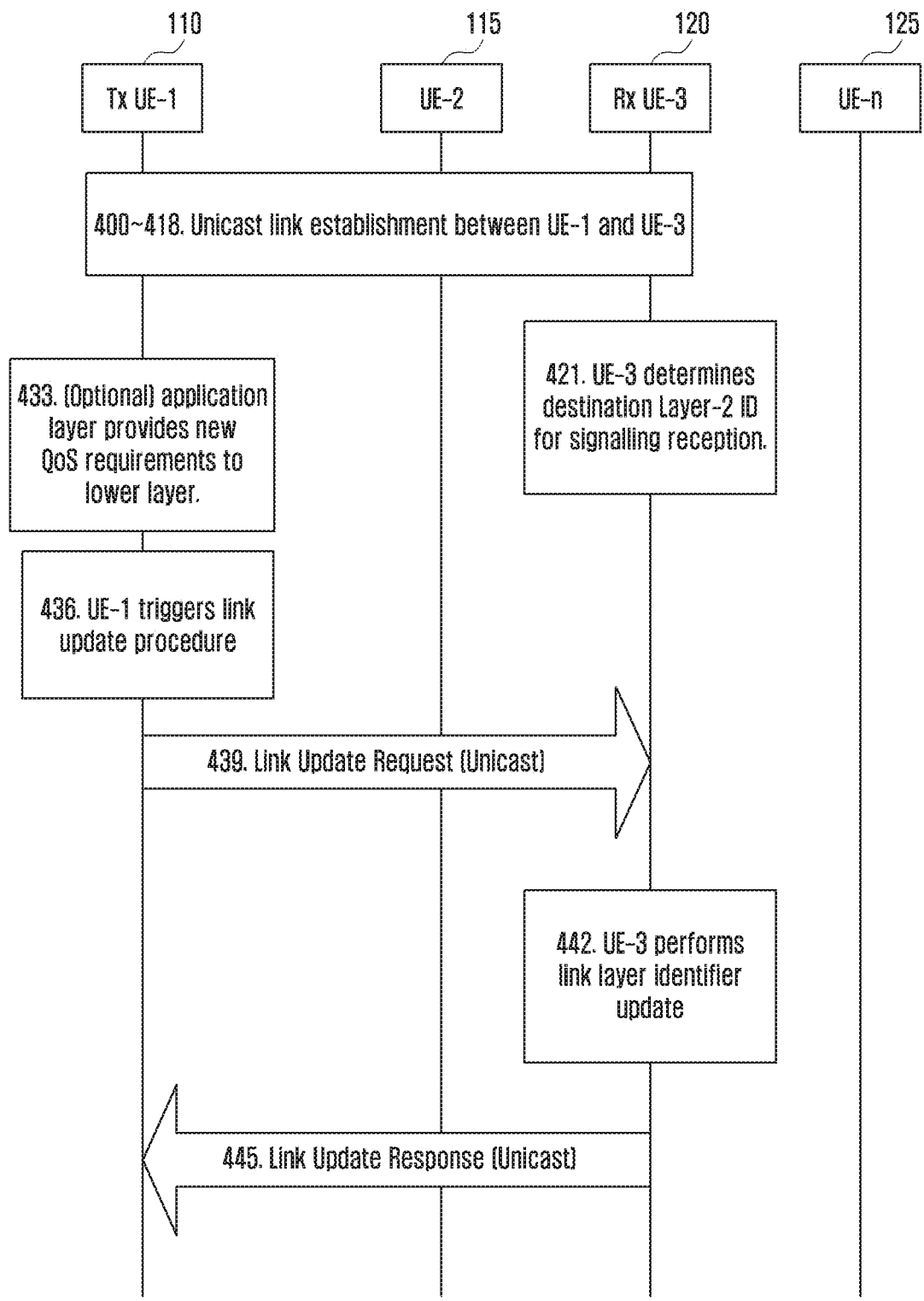
FIG. 4C illustrates a procedure of updating a direct communication link according to an embodiment of the disclosure.

The PC5 signaling protocol layer 210 or 215 may provide link establishment and link maintenance functions for direct communication 140 between the terminal 110 and the terminal 120 through the procedures shown in FIGS. 4A, 4B, and 4C.

Referring to FIG. 2A, a PC5 signaling (PC5-S) message of the terminal 110 or 120 may be transmitted to the opponent terminal through the PC5 signaling protocol layer 210 or 215, the RRC layer 220 or 225, the PDCP layer 230 or 235, the RLC layer 240 or 245, the MAC layer 250 or 255, and the PHY layer 260 or 265.

Alternatively, referring to FIG. 2A, a PC5 signaling (PC5-S) message of the terminal 110 or 120 may be transmitted to the opponent terminal through the PC5 signaling protocol layer 210 or 215, the PDCP layer 230 or 235, the RLC layer 240 or 245, the MAC layer 250 or 255, and the PHY layer 260 or 265.

Referring to FIG. 2B, the user plane protocol stack of the terminal 110 or 120 may include an application layer 270 or 275, a service enabling (SE) layer 280 or 285, a service data adaptation protocol (SDAP) layer 290 or 295, a PDCP layer 230 or 235, an RLC layer 240 or 245, a MAC layer 250 or 255, and a PHY layer 260 or 265. The SDAP layer 290 or 295, the PDCP layer 230 or 235, the RLC layer 240 or 245, and the MAC layer 250 or 255 may be collectively referred to as the AS layer 200 or 205. Hereinafter, in describing the disclosure, the AS layer 200 or 205 may include at least one of the SDAP layer 290 or 295, the PDCP layer 230 or 235, the RLC layer 240 or 245, and the MAC layer 250 or 255.

The SE layer 280 or 285 is an intermediate layer for performing the operation of the application layer 270 or 275, and may provide specialized functions to respective applications or services. A single SE layer may support multiple application layers. In addition, a specialized SE layer may be defined for each application layer. For example, application layer 270 or 275 may be a V2X application layer for providing V2X services. In addition, the SE layer 280 or 285 may be defined as a V2X layer for the operation of the V2X application layer. Hereinafter, in order to provide V2X services, the application layer 270 or 275 may be used interchangeably with a V2X application layer, and the SE layer 280 or 285 may be used interchangeably with a V2X layer.

The SE layer 280 or 285 may provide a function of transmitting data through a link established between the terminal 110 and the terminal 120 for direct communication 140. The SE layer 280 or 285 may include IP protocol, non-IP protocol, and transport protocol (e.g., TCP or UDP) for transmitting messages.

The terminal 110 or 120 according to an embodiment may acquire and store the following information shown in Table 1 in order to use V2X services. The SE layer 280 or 285 may use stored information.

TABLE 1

1) Authorization policy:
    When the UE is "served by E-UTRA" or "served by NR":

TABLE 1-continued

PLMNs in which the UE is authorized to perform V2X communications over PC5 reference point when "served by E-UTRA" or "served by NR".
For each above PLMN:
    RAT(s) over which the UE is authorized to perform V2X communications over PC5 reference point.
    When the UE is "not served by E-UTRA" and "not served by NR":
        Indicates whether the UE is authorized to perform V2X communications over PC5 reference point when "not served by E-UTRA" and "not served by NR".
        RAT(s) over which the UE is authorized to perform V2X communications over PC5 reference point.
2)    Radio parameters when the UE is "not served by E-UTRA" and "not served by NR":
    Includes the radio parameters per PC5 RAT (i.e., LTE PC5, NR PC5) with geographical area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.
NOTE: Whether a frequency band is "operator managed" or "non-operator managed" in a given geographical area is defined by local regulations.
3)    Policy/parameters per RAT for PC5 Tx profile selection:
    The mapping of service types (e.g. PSID or ITS-AIDs) to Tx profiles.
4)    Policy/parameters related to privacy:
    The list of V2X services, e.g. PSID or ITS-AIDs of the V2X applications, with geographical area(s) that require privacy support.
5)    Policy/parameters when NR PC5 is selected:
    The mapping of service types (e.g. PSID or ITS-AIDs) to V2X frequencies with geographical area(s).
    The mapping of destination layer-2 ID(s) and the V2X services, e.g. PSID or ITS-AIDs of the V2X application for broadcast.
    The mapping of destination layer-2 ID(s) and the V2X services, e.g. PSID or ITS-AIDs of the V2X application for groupcast.
    The mapping of default destination layer-2 ID(s) for initial signaling to establish unicast connection and the V2X services, e.g. PSID or ITS-AIDs of the V2X application.
    The list of V2X services that are allowed to use a specific PQI(s)

The SDAP layer 290 or 295 may be used in transmitting data through direct communication 140 between the terminal 110 and the terminal 120. For example, when establishing a link for direct communication 140 between the terminal 110 and the terminal 120 and then transmitting data through the established link (for example, PC5 unicast communication or PC5 groupcast), the SDAP layer 290 or 295 may be used in transmission of messages. In addition, for example, even when transmitting data without establishing a link for direct connection 140 between the terminal 110 and the terminal 120 (for example, PC5 broadcast communication), the SDAP layer 290 or 295 may be used in transmission of messages.

The PC5 signaling protocol layer 210 or 215 according to an embodiment may include functions provided by the SE layer 280 or 285. Alternatively, the PC5 signaling protocol layer 210 or 215 may interact with the SE layer 280 or 285, the RRC layer 220 or 225, the PDCP layer 230 or 235, and/or the SDAP layers 290 or 295 for link establishment and/or link maintenance.

The terminals 110 and 120 according to an embodiment may store the following information shown in Table 2 in order to provide services (e.g., V2X services) using direct communication. The SE layer 280 or 285 may use the stored information.

TABLE 2

| PQI Value | Resource Type | Default Priority Level | Packet Delay Budget | Packet Error Rate | Default Maximum Data Burst Volume | Default Averaging Window | Example Services |
| --- | --- | --- | --- | --- | --- | --- | --- |
| 1 | GBR (NOTE 1) | 3 | 20 ms | $10^{-4}$ | N/A | 2000 ms | Platooning between UEs-Higher degree of automation; Platooning between UE and RSU-Higher degree of automation; |
| 2 | | 4 | 50 ms | $10^{-2}$ | N/A | 2000 ms | Sensor sharing-higher degree of automation |
| 3 | | 3 | 100 ms | $10^{-4}$ | N/A | 2000 ms | Information sharing for automated driving-between UEs or UE and RSU-higher degree of automation; |
| 55 | Non-GBR | 3 | 10 ms | $10^{-4}$ | N/A | N/A | Cooperative lane change-higher degree of automation; |
| 56 | | 6 | 20 ms | $10^{-1}$ | N/A | N/A | Platooning informative exchange-low degree of automation; Platooning-information sharing with RSU; |

TABLE 2-continued

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 57 | | 5 | 25 ms | $10^{-1}$ | N/A | N/A | Cooperative lane change-lower degree of automation; |
| 58 | | 4 | 100 ms | $10^{-2}$ | N/A | N/A | Sensor information sharing-lower degree of automation |
| 59 | | 6 | 500 ms | $10^{-1}$ | N/A | N/A | Platooning-reporting to an RSU; |
| 82 | Delay Critical GBR (NOTE 1) | 3 | 10 ms | $10^{-4}$ | 2000 bytes | 2000 ms | Cooperative collision avoidance; Sensor sharing-Higher degree of automation; Video sharing-higher degree of automation; |
| 83 | | 2 | 3 ms | $10^{-5}$ | 2000 byte | 2000 ms | Emergency trajectory alignment; Sensor sharing-Higher degree of automation |

NOTE 1:
GBR and Delay Critical GBR PQIs can only be used for unicast PC5 communications.
Editor's Note:
It is FFS if GBR and Delay Critical GBR can also be used for broadcast and groupcast.
NOTE 2:
The MBDV value for Non-GBR PQIs is an informative indication of typical packet size.

Referring to Table 2, QoS parameters may include one or more QoS characteristics. The QoS characteristics may be, for example, a priority level, a packet delay budget, a packet error rate, a maximum data burst volume, an average window, a communication range, and the like. The QoS parameters may include one or more QoS characteristics, and may be referred to as "PQI (5QI for PC5) values".

Figure 3:
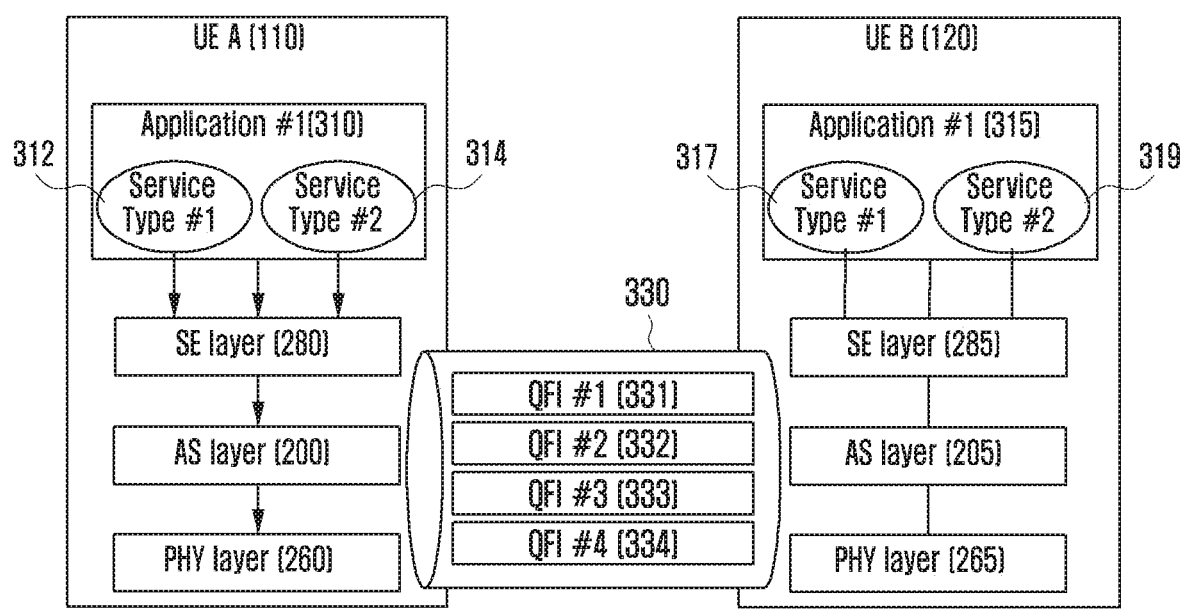
FIG. 3 illustrates a configuration of a direct communication link according to an embodiment of the disclosure.

FIG. 3 illustrates a configuration of a direct communication link between terminals according to an embodiment of the disclosure.

Referring to FIG. 3, the terminal 110 and the terminal 120 may store and drive the same applications 310 and 315. The applications may be identified by application identifications (IDs) (e.g., OSAppIDs or the like). The applications 310 and 315 may provide one or more services. For example, the applications 310 and 315 may include service type #1 (312 or 317) and service type #2 (314 or 319). The respective service types may be distinguished by service type IDs (e.g., PSIDs, ITS-AIDs, etc.).

The terminal according to an embodiment may have one or more applications installed therein, and the one or more applications may be simultaneously executed. The application layer user IDs (e.g., terminal IDs, terminal subscriber IDs, user email addresses, etc.) related to the respective applications may be implemented in any of various methods as follows.

For example, one application layer user ID may be used for one application. In this case, the application layer user ID may be assigned as a unique value to each user and application. Referring to FIG. 3, in the case where Application #1 (310), Application #2, and Application #3 are installed in the terminal 110, respective ones of Application #1 (310), Application #2, and Application #3 may be distinguished by application layer user IDs. In this case, the SE layer 280 may identify the respective ones of Application #1 (310), Application #2, and Application #3 using application layer user IDs.

Alternatively/in addition, one application layer user ID may be used for one or more applications. For example, one or more applications may share one application layer user ID.

Referring to FIG. 3, in the case where Application #1 (310), Application #2, and Application #3 are installed in the terminal 110, Application #1 (310) and Application #2 may use one application layer user ID, and Application #3 may use another application layer user ID. In this case, the SE layer 280 may identify Application #1 (310) and Application #2 using the same one application layer user ID, and may identify Application #3 using one application layer user ID.

Alternatively/in addition, one application layer user ID may be used for all applications. For example, all applications may share one application layer user ID.

Referring to FIG. 3, in the case where Application #1 (310), Application #2, and Application #3 are installed in the terminal 110, all the applications installed in the terminal 110 may use one application layer user ID. For example, the applications may not be further identified using application layer user IDs. In this case, the SE layer 280 may be aware that one application layer user ID is applied to all applications of the terminal 110, and may use the same.

Hereinafter, in describing the disclosure, the operation of applications 310 and 315 and/or services types 312, 314, 317, and 319 may be understood as the operation of the application layers 270 and 275 shown in FIG. 2B. One or more applications and/or service types may be driven by the application layers 270 and 275.

The service type may have one or more QoS requirements. The SE layer 280 or 285 may determine QoS parameters to meet the QoS requirements provided from the applications 310 and 315 and/or the service types 312, 314, 317, and 319, and may map the same to PQI values shown in Table 2.

Figure 5A:
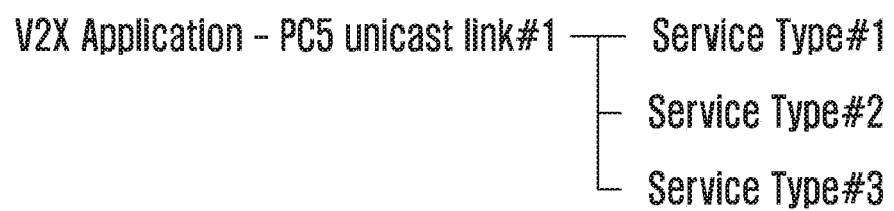
FIG. 5A is a diagram illustrating producing of a direct communication link according to an embodiment of the disclosure.

The terminal 110 and the terminal 120 may establish a direct communication link 330 using the procedure shown in FIG. 4A, FIG. 4B, and FIG. 4C. The direct communication link 330 may be referred to as a "link ID". According to an embodiment of the disclosure, the terminal 110 and the terminal 120 may establish one direct communication link 330 for each of the applications 310 and 315, and may provide one or more service types (e.g., PSID, ITS-AID, etc.) using the direct communication link 330. For example, as shown in FIG. 5A, one application may have one direct communication link.

Figure 5B:
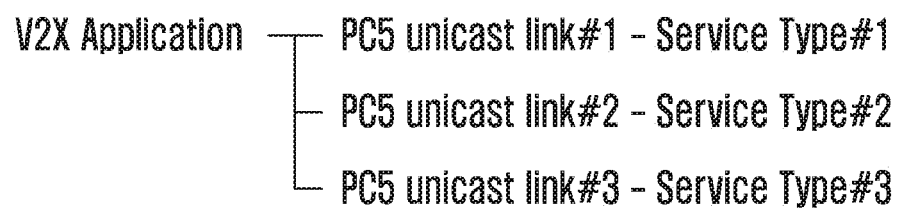
FIG. 5B is a diagram illustrating producing of a direct communication link according to an embodiment of the disclosure.

Alternatively, according to an embodiment of the disclosure, the terminal 110 and the terminal 120 may establish a direct communication link 330 for each service type 312, 317, 314, or 319. One application including a plurality of service types may produce direct communication links 330 supporting the respective service types, and each direct communication link may provide each service type (e.g., PSID, ITS-AID, etc.). For example, as shown in FIG. 5B, one application may have direct communication links equal to the number of supported service types.

The direct communication link 330 may include one or more QoS flows. The QoS flows may be mapped to the PQI values shown in Table 2. One QoS flow may be referred to as a "QoS flow identifier (QFI)". For example, as shown in FIGS. 4A-4C, the direct communication link 330 may include four QoS flows, and the respective QoS flows may be called "QFI #1" (331), "QFI #2" (332), and "QFI #3" (333), and "QFI #4" (334). The respective QoS flows constituting the direct communication link 330 may provide different levels of QoSs. A procedure of establishing the direct communication link 330 will be described below with reference to FIG. 4A.

The terminals 110 and 120 may transmit data using the procedure shown in FIG. 4B. The terminals 110 and 120 may transmit data using the QoS flows included in the direct communication link 330 for transmission of data. The SE layer 280 or 285 may select an appropriate QFI according to the QoS required for the data to be transmitted, and may transmit data using the selected QFI. A procedure of transmitting data through the direct communication link 330 will be described below with reference to FIG. 4B.

FIG. 4A illustrates a procedure of establishing a direct communication link according to an embodiment of the disclosure.

For the description of the disclosure, it is assumed that the transmitting terminal 110 may initiate establishment of a direct communication link and that the remaining peripheral terminals 115, 120, and 125 are located adjacent to the transmitting terminal 110, and may receive a direct communication request message 425 transmitted from the transmitting terminal 110. In addition, it is assumed that at least one of the peripheral terminals 115, 120, and 125, for example, the terminal 120, performs direct communication 440 with the transmitting terminal 110.

Referring to FIG. 4A, the peripheral terminal 115, 120, and 125 may determine a destination layer-2 ID for receiving a direct communication request message 409, based on the V2X service policy parameter in Table 1 (for example, it corresponds to "The mapping of default destination layer-2 ID(s) for initial signaling to establish unicast connection and the V2X services, e.g., PSID or ITS-AIDs of the V2X application" in Table 1) in operation 400. The destination layer-2 ID for receiving a direct communication request message may be determined to be different values for respective application layers, respective applications supported by the application layer, or respective service types supported by the application layer (e.g., PSID, ITS-AID, etc.). Alternatively, the destination layer-2 ID for receiving a direct communication request message may be determined to be the same default value, regardless of the application layer, the application supported by the application layer, or the service type supported by the application layer.

The application layer 270 of the terminal 110 to perform the application operation may provide the SE layer 280 with at least one of "application data" produced by the application layer 270 in operation 403 (hereinafter, this will be used interchangeably with "service data" or "data"), a "service type" indicating the type of data, a "communication mode" indicating the communication method of data (e.g., broadcast, groupcast, unicast, or the like), an "application layer user ID" (application layer user identifier) of the transmitting terminal 110, an "application layer user ID" (application layer user identifier) of the receiving terminal 120, and "QoS requirements". In the case of vehicle communication, PSID, ITS-AID, and the like may be used as the service type. The application layer 270 may provide the SE layer 280 with one or more service types. In addition, the application layer 270 may provide the SE layer 280 with one or more QoS requirements. Further, the application layer 270 may provide the SE layer 280 with service types and mapping information between one or more QoS requirements and the service types. An example of information provided by the application layer 270 to the SE layer 280 in operation 403 is as follow.

application data
    an application ID (e.g., 310 in FIG. 3)
    at least one service type (e.g., corresponding to 312 and 314 in FIG. 3)
    one or more QoS requirements mapped to respective service types
    communication mode
    application layer user IDs of the transmitting and receiving terminals 110 and 120

The SE layer 280 of the terminal 110 may determine whether or not to perform a link establishment procedure in operation 406, based on information received from the application layer 270 in operation 403 (e.g., the application data, the communication mode, the service type, and the like). For example, if the communication mode received from the application layer 270 is PC5 unicast, the SE layer 280 may determine that a link is required to be established. If it is determined whether or not a pre-established direct communication link is recycled, and if it is determined that the pre-established direct communication link is unable to be recycled, the SE layer 280 may determine to perform the establishment procedure, thereby performing the following operation. If the pre-established direct communication link is able to be recycled, the SE layer 280 may perform the procedure shown in FIG. 4B.

For example, if there is a link profile that stores application layer user ID of the transmitting terminal 110 and/or the application layer user ID of the receiving terminal 120 in operation 403 from the application layer 270, the SE layer 280 may recognize that the terminal 110 has a pre-established direct communication link with the terminal 120. Accordingly, the SE layer 280 may determine to recycle the pre-established direct communication link, instead of establishing a new direct communication link, and may perform the procedure shown in FIG. 4B. According to an embodiment of the disclosure, in the case where one application layer user ID is used in each application, the terminal 110 may establish one direct communication link with the terminal 120 for each application. For example, one direct communication link may be produced for each application, and signaling and data for one application may be transmitted through one direct communication link. Alternatively, in the case where one application layer user ID is used in one or more applications, the terminal 110 may establish one direct communication link with the terminal 120 for the applications sharing the application layer user ID. For example, applications sharing one application layer user ID may share one direct communication link, and may transmit signaling and data for the applications through one direct communication link. Alternatively, in the case where one application layer user ID is used in all applications, a single direct communication link may be established between the terminal 110 and the terminal 120, thereby transmitting signaling and data for all applications supported by the terminal 110 and the terminal 120 through the single direct communication link.

If there is not a link profile that stores application layer user ID of the transmitting terminal 110 and/or the application layer user ID of the receiving terminal 120, the SE layer may perform the following procedure.

The SE layer 280 of the terminal 110 may assign a link identifier (ID) indicating the direct communication link 330 to be established through the processes of operation 409 to operation 418. The link ID may be assigned as a unique value in the terminal 110. The SE layer 280 may produce a link profile for the direct communication link 330 indicated as the link ID assigned by the SE layer 280. The link profile may include application layer user IDs of the transmitting and receiving terminals 110 and 120 received by the SE layer 280 from the application layer 270 in operation 403.

Figure 6A:
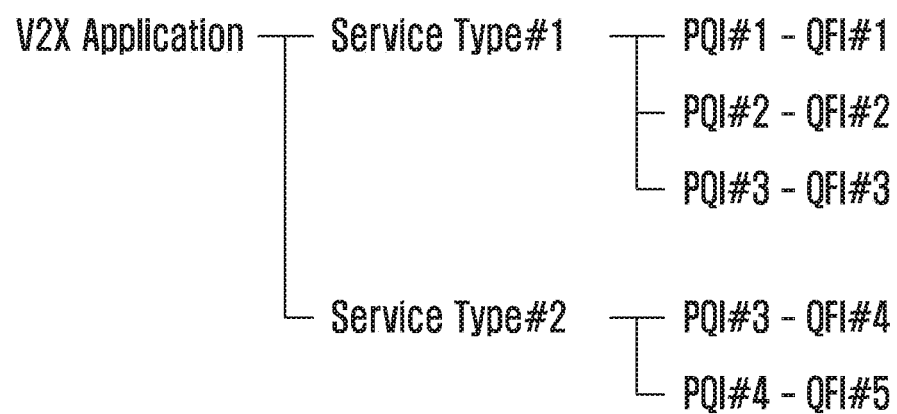
FIG. 6A is a diagram illustrating QoS flow identifier (QFI) mapping in relation to a direct communication link according to an embodiment of the disclosure.

In addition, the SE layer 280 may convert the QoS requirements received from the application layer 270 in operation 403 into PQI (PC5 5QI) values that are available for the AS layer 200. One service type may request message a plurality of QoS requirements and, thus, one service type may be mapped to a plurality of PQI values. In addition, the SE layer 280 may assign QFIs to respective PQI values. According to an embodiment of the disclosure, if the service types are different with respect to the same PQI value (e.g., PQI #3), different QFI values (e.g., QFI #3 and QFI #4) may be assigned thereto. This example is shown in FIG. 6A.

Figure 6B:
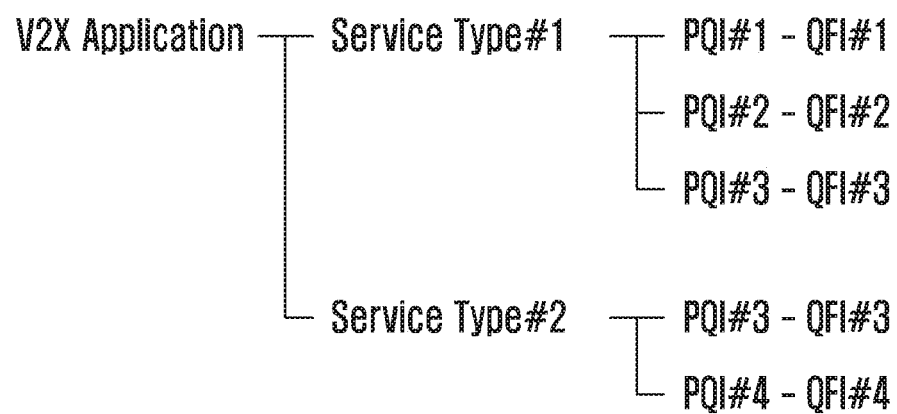
FIG. 6B a diagram illustrating QFI mapping in relation to a direct communication link according to an embodiment of the disclosure.

Alternatively, according to an embodiment of the disclosure, even if the service types are different with respect to the same PQI value (e.g., PQI #3), the same QFI value (e.g., QFI #3) may be assigned thereto. This example is shown in FIG. 6B.

The link profile produced and managed by the SE layer 280 may include and store at least one of PQI values associated with a direct communication link, QFI values corresponding to respective PQI values, service types corresponding to respective PQI values, and service types corresponding to respective QFI values.

The SE layer 280 may determine its own layer-2 ID of the terminal 110 to be used for direct communication, and may assign the same to itself. The SE layer 280 may store its own layer-2 ID of the terminal 110 in the link profile produced and managed by the SE layer 280. An example of information stored in the link profile produced by the SE layer 280 in operation 406 is as follows. The link profile may be referred to as a "link ID".

- an application layer user ID of the terminal 110 (the information received from the application layer 270 in operation 403)
- an application layer user ID of the terminal 120 (the information received from the application layer 270 in operation 403)
- a layer-2 ID of the terminal 110 (the layer-2 ID assigned by the terminal itself)
- an application ID supported by a direct communication link (corresponding to, for example, 310 in FIG. 3)
- one or more service types supported by a direct communication link (corresponding to, for example, 312 and 314 in FIG. 3)
- one or more PQI values supported by a direct communication link
- one or more QFI values supported by a direct communication link
- mapping information between service types, PQIs, and QFIs supported by a direct communication link The SE layer 280 may produce a direct communication request message for establishing a unicast link. The direct communication request message may include at least one of an "application message", an "application ID", a "service type", an "application layer user ID" (application layer user identifier) of the transmitting terminal 110, an "application layer user ID" (application layer user identifier) of the receiving terminal 120, a "link ID" indicating the direct communication link, "QoS requirements" that must be provided by the direct communication link, a "PQI", a "QFI", and a "layer-2 ID" of the transmitting terminal 110, which are received from the application layer 270 in operation 403. An example of information included in the direct communication request message is as follows.

- application data
- an application layer user ID of the terminal 110
- an application layer user ID of the terminal 120
- a link ID indicating a direct communication link
- an application ID supported by a direct communication link (corresponding to, for example, 310 in FIG. 3)
- one or more service types supported by a direct communication link (corresponding to, for example, 312 and 314 in FIG. 3)
- one or more QoS requirements supported by a direct communication link,
- one or more PQI values supported by a direct communication link
- one or more QFI values supported by a direct communication link
- mapping information between service types, PQIs, and QFIs supported by a direct communication link The SE layer 280 may determine a source layer-2 ID and a destination layer-2 ID to be included in a MAC header in order to transmit the produced direct communication request message. The SE layer 280 may use the layer-2 ID assigned by the terminal 110 itself as the source layer-2 ID. The source layer-2 ID may be the same as the layer-2 ID value of the terminal 110 stored in the link profile. In addition, the SE layer 280 may refer to the V2X service policy parameters in Table 1, which are stored by the terminal, in order to determine the destination layer 2-ID. For example, the destination layer-2 ID may be determined based on "The mapping of default destination layer-2 ID(s) for initial signaling to establish unicast connection and the V2X services, e.g., PSID or ITS-AIDs of the V2X application" in Table 1. The destination layer-2 ID may be the same value as the destination layer-2 ID determined by the peripheral terminals 115, 120, and 125 in operation 400.

The SE layer 280 may deliver information to the AS layer 200 in order to transmit a direct communication request message. The information delivered to the AS layer 200 may include at least one of a direct communication request message, a source layer-2 ID of the message, a destination layer-2 ID of the message, a link ID, a PQI value, a QFI value, mapping information between the PQI and the QFI, a communication mode (e.g., PC5 broadcast), and the type of message {e.g., a signal (control) message}. An example of information that the SE layer 280 delivers to the AS layer 200 is as follows.

Figure 7A:
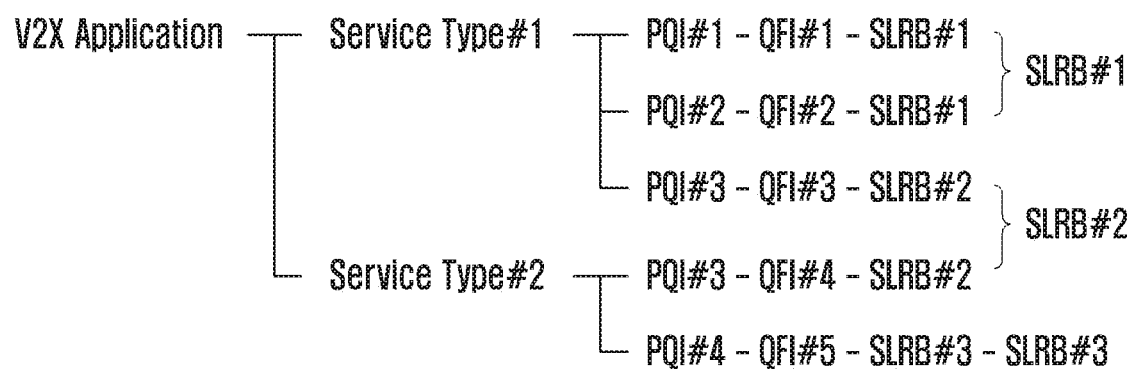
FIG. 7A is a diagram illustrating sidelink radio bearer (SLRB) mapping in relation to a direct communication link according to an embodiment of the disclosure.

- a direct communication request message
- a source layer-2 ID of the message
- a destination layer-2 ID of the message
- a link ID indicating a direct communication link
- one or more PQI values supported by a direct communication link
- one or more QFI values supported by a direct communication link
- mapping information between service types, PQIs, and QFIs supported by a direct communication link
- a communication mode
- the type of message The AS layer 200 may store information delivered from the SE layer 280, and may manage a sidelink radio bearer (SLRB) for direct communication. According to an embodiment of the disclosure, one QFI value may be assigned to one PQI value, and one QFI value may be mapped to one SLRB (e.g., QFI #5 and SLRB #3). Alternatively, if the service types are different, different QFI values may be assigned to the same PQI value, and multiple QFI values may be mapped to one SLRB (e.g., QFI #3, QFI #4, and SLRB #2). Alternatively, one QFI value may be assigned to one PQI value, and multiple QFI values may be mapped to one SLRB (e.g., QFI #1, QFI #2, and SLRB #1). This example is shown in FIG. 7A.

Figure 7B:
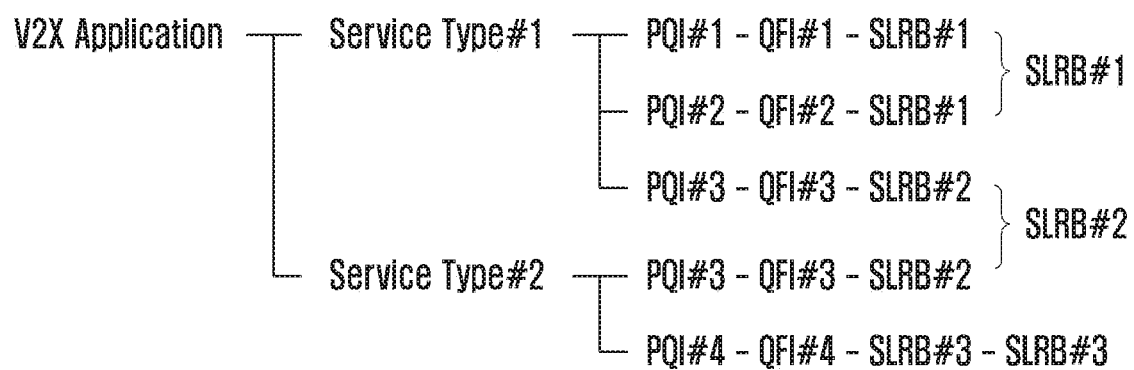
FIG. 7B is a diagram illustrating sidelink radio bearer (SLRB) mapping in relation to a direct communication link according to an embodiment of the disclosure.

Alternatively, according to an embodiment of the disclosure, one QFI value may be assigned to one PQI value, and one QFI value may be mapped to one SLRB (e.g., QFI #4 and SLRB #3). Alternatively, even if the service types are different, one QFI value may be assigned to the same PQI value, and one QFI value may be mapped to one SLRB (e.g., QFI #3 and SLRB #2). Alternatively, one QFI value may be assigned to one PQI value, and multiple QFI values may be mapped to one SLRB (e.g., QFI #1, QFI #2, and SLRB #1). This example is shown in FIG. 7B.

Figure 8:
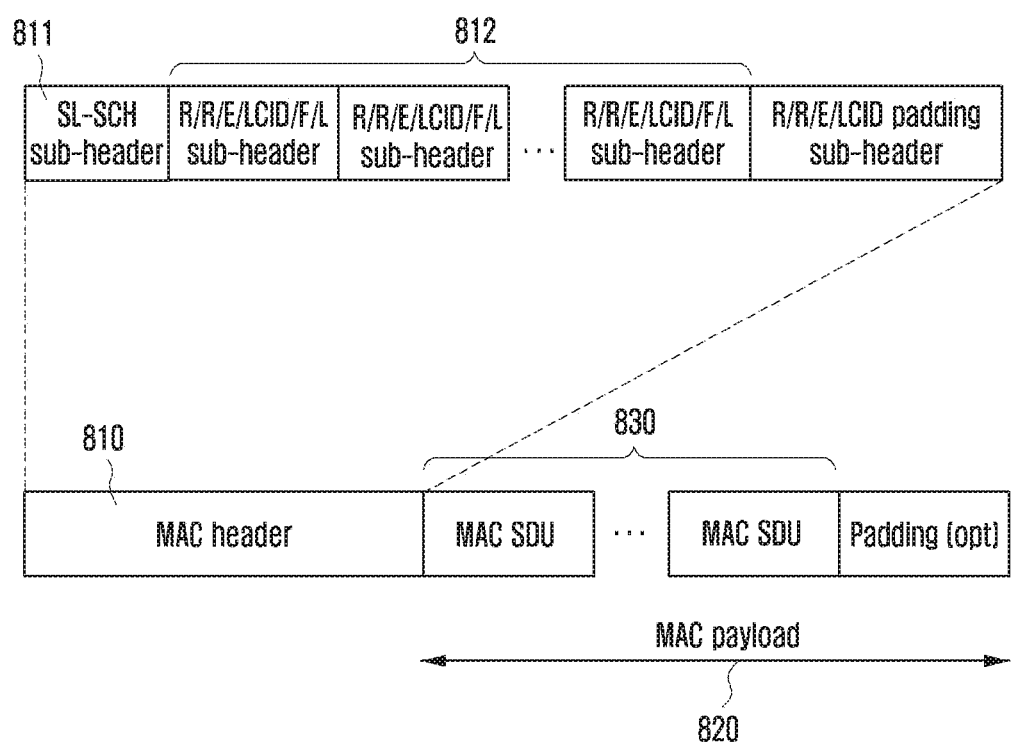
FIG. 8 is a diagram illustrating a configuration of a medium access control (MAC) protocol data unit (PDU) according to an embodiment of the disclosure.

The AS layer 200 may configure a MAC header, based on information delivered from the SE layer 280. An example of configuring a MAC PDU is shown in FIG. 8. The MAC PDU may include a MAC header 810. The MAC header may include an SL-SCH sub-header 811 and an R/R/E/LCID/F/L sub-header 812. The SL-SCH sub-header 811 may be commonly applied to the entire MAC payload 820. The R/R/E/LCID/F/L sub-header 812 may sequentially correspond to one MAC SDU 830 of the MAC payload.

Figure 9:
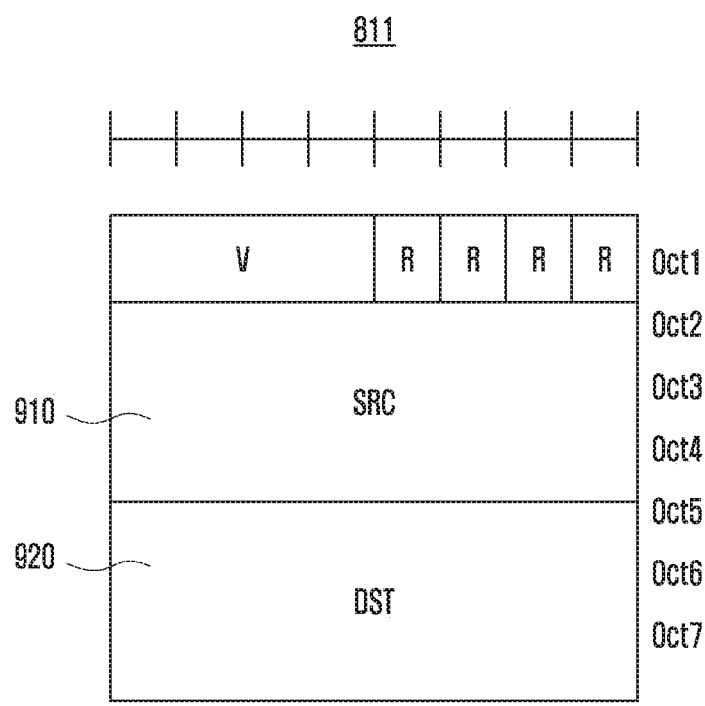
FIG. 9 is a diagram illustrating a configuration of a sub-header of a sidelink-shared channel (SL-SCH) according to an embodiment of the disclosure.

FIG. 9 is a diagram illustrating a configuration of a SL-SCH sub-header shown in FIG. 8 according to an embodiment of the disclosure. The SL-SCH sub-header 811 may include a source layer-2 ID 910 (corresponding to SRC in Table 4) and a destination layer-2 ID 920 (corresponding to DST in Table 4). The source layer-2 ID 910 and the destination layer-2 ID 920 may have a range of 3 octet values or 2 octet values, respectively. The AS layer 200 may configure the source layer-2 ID delivered from the SE layer 280 as the source layer-2 ID 910 of the SL-SCH sub-header (corresponding to the SRC in Table 4). In addition, the AS layer 200 may configure the destination layer-2 ID delivered from the SE layer 280 as the destination layer-2 ID 920 of the SL-SCH sub-header (corresponding to the DST in Table 4).

The R/R/E/LCID/F/L sub-header 812 may include a logical channel ID (LCID) indicating the type of message of the MAC SDU 830 indicated by the sub-header. Table 3 shows an example of the LCID. The AS layer 200 may determine the LCID, based on the type of message delivered from the SE layer 280. For example, if the type of message indicates a signaling message, the LCID may be set to 11100, 11101, or 11110.

TABLE 3

| Index | LCID values |
|---|---|
| 00000 | Reserved |
| 00001-01010 | Identity of the logical channel |
| 01011-10100 | Identity of the logical channel which is used for duplication |
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

The AS layer 200 may configure the MAC header 810 as described above, and may include a direct communication request message received from the SE layer 280 in the MAC payload 820, thereby transmitting the same to the peripheral terminals 115, 120, and 125 through a physical layer 260 (operation 409).

The peripheral terminals 115, 120, and 125 of the transmitting terminal 110 may receive a direct communication request message transmitted from the transmitting terminal 110 (operation 412). The peripheral terminals 115, 120, and 125 may delivered the received direct communication request message to the SE layer through the PHY layers and the AS layers of the terminals 115, 120, and 125. Upon receiving the direct communication request message, the SE layer may identify a destination address of the message, thereby determining a method of processing the message. If the destination address of the message is the destination layer-2 ID address determined by the terminal in operation 400, the SE layer may determine that the received message is a direct communication request message among the PC5-S signaling messages. The SE layer may select an application layer to which the received message is to be delivered based on at least one of the "destination layer-2 ID address" of the received message, the "service type" included in the received message, the "application layer user ID (application layer user identifier) of the terminal" included in the received message, or the "application ID" included in the received message, and may deliver the received message to the selected application layer.

The application layer 275 of the terminal 120 receiving the direct communication request message may determine to respond to the received direct communication request message, based on "application data", a "service type", an "application layer user ID" (application layer user identifier) of the transmitting terminal 110, an "application layer user ID" (application layer user identifier) of the receiving terminal 120, and the like included in the received direct communication request message.

The application layer 275 of the terminal 120 that wishes to accept the received direct communication request may provide the SE layer 285 with at least one of the "application data" produced by the application layer 275 in operation 412 (hereinafter, this will be used interchangeably with "service data" or "data"), a "service type" indicating the type of data, a "communication mode" indicating the communication method of data (e.g., broadcast, groupcast, unicast, or the like), an "application layer user ID" (application layer user identifier) of the transmitting terminal 110, an "application layer user ID" (application layer user identifier) of the receiving terminal 120, and "QoS requirements". In the case of vehicle communication, PSID, ITS-AID, or the like may be used as the service type. The application layer 275 may provide the SE layer 285 with one or more service types. In addition, the application layer 275 may provide the SE layer 285 with one or more QoS requirements. Further, the application layer 275 may provide the SE layer 285 with service types and mapping information between one or more QoS requirements and the service types. An example of information provided by the application layer 275 to the SE layer 285 in operation 412 is as follow.

application data an application ID (e.g., 315 in FIG. 3)

one or more service types (corresponding to, for example, 317 and 319 in FIG. 3)

one or more QoS requirements mapped to respective service types communication mode application layer user IDs of the transmitting and receiving terminals 110 and 120

The SE layer 280 of the terminal 120 may determine whether or not to perform a link establishment procedure in operation 415, based on the information received from the application layer 275 in operation 412 (e.g., the application data, the communication mode, the service type, and the like). For example, if the application data received from the application layer 275 requires establishment of a direct communication link, the SE layer 285 may determine to perform a link establishment procedure. The SE layer 285 may perform the following operations, based on the information received from the application layer 275 in operation 412 and the information received from the transmitting terminal 110 in operation 409 (operation 415).

The SE layer 285 of the terminal 120 may assign a link identifier (ID) indicating the direct communication link 330 to be established through the processes of operation 415 to operation 418. Alternatively, the SE layer 285 may use the link ID received from the transmitting terminal 110 in operation 409. The link ID may be assigned as a unique value in the terminal 120. The SE layer 285 may produce a link profile for the direct communication link 330 indicated using the link ID assigned by the SE layer 285. The link profile may include application layer user IDs of the transmitting and receiving terminals received in operation 412 or operation 409.

In addition, the SE layer 285 may convert the QoS requirements received in operation 412 or operation 409 into PQI (PC5 5QI) values that are available for the AS layer 205 in order to determine the PQIs to be supported in direct communication. Alternatively, the SE layer 285 may use the PQI values received in operation 409.

The SE layer 285 may determine the QFI mapped to the PQI to be supported in direct communication. Alternatively, the SE layer 285 may determine the QFI using mapping information between the PQI value received in operation 409 and the QFI.

The method described in operation 406 may be applied to the relationship between the service types, the QoS requirements, the PQIs, and the QFIs in a similar manner.

The link profile produced and managed by the SE layer 285 may include and store at least one of PQI values associated with a direct communication link, QFI values corresponding to respective PQI values, service types corresponding to respective PQI values, and service types corresponding to respective QFI values.

The SE layer 285 may determine its own layer-2 ID of the terminal 120 to be used for direct communication, and may assign the same to itself. The SE layer 285 may store its own layer-2 ID of the terminal 120 in a link profile produced and managed by the SE layer 285. An example of information stored in the link profile produced by the SE layer 285 in operation 415 is as follows. The link profile may be referred to as a "link ID".

an application layer user ID of the terminal 110 (the information received in operation 409 to operation 415)

an application layer user ID of the terminal 120 (the information received in operation 409 to operation 415)

a layer-2 ID of the terminal 110 (the information received in operation 409)

a layer-2 ID of the terminal 120 (the layer-2 ID assigned by the terminal itself in operation 415)

an application ID supported by a direct communication link (corresponding to, for example, 315 in FIG. 3)

one or more service types supported by a direct communication link (corresponding to, for example, 317 and 319 in FIG. 3)

one or more PQI values supported by a direct communication link one or more QFI values supported by a direct communication link mapping information between service types, PQIs, and QFIs supported by a direct communication link The SE layer 285 may produce a direct communication response message for establishing a unicast link. The direct communication response message may include at least one of the "application message" received in operation 412, the "application ID" received in operation 412 or 409, a "service type", an "application layer user ID" (application layer user identifier) of the transmitting terminal 110, an "application layer user ID" (application layer user identifier) of the receiving terminal 120, a "link ID" indicating the direct communication link, "QoS requirements" that must be provided by the direct communication link, a "PQI", a "QFI", a "layer-2 ID" of the transmitting terminal 110, and a "layer-2 ID" of the transmitting terminal 120. An example of information included in the direct communication request message is as follows.

application data an application layer user ID of the terminal 110 an application layer user ID of the terminal 120 a link ID indicating a direct communication link an application ID supported by a direct communication link (corresponding to, for example, 315 in FIG. 3)

one or more service types supported by a direct communication link (corresponding to, for example, 317 and 319 in FIG. 3)

one or more QoS requirements supported by a direct communication link one or more PQI values supported by a direct communication link one or more QFI values supported by a direct communication link mapping information between service types, PQIs, and QFIs supported by a direct communication link The SE layer 285 may determine a source layer-2 ID and a destination layer-2 ID to be included in a MAC header in order to transmit the produced direct communication response message. The SE layer 285 may use the layer-2 ID assigned by the terminal 120 itself as the source layer-2 ID. The source layer-2 ID may be the same as the layer-2 ID value of the terminal 120 stored in the link profile. In addition, the SE layer 285 may use the source layer-2 ID of the direct communication request message received in operation 409 as the destination layer-2 ID. The destination layer-2 ID may be the same as the layer-2 ID value of the terminal 110 stored in the link profile.

The SE layer 285 may deliver information to the AS layer 205 in order to transmit a direct communication response message. The information delivered to the AS layer 205 may include at least one of a direct communication response message, a source layer-2 ID of the message, a destination layer-2 ID of the message, a link ID, a PQI value, a QFI value, mapping information between the PQI and the QFI, a communication mode (e.g., PC5 broadcast), and the type of message {e.g., a signal (control) message}. An example of information that the SE layer 285 delivers to the AS layer 205 is as follows.

a direct communication response message
    a source layer-2 ID of the message
    a destination layer-2 ID of the message
    a link ID indicating a direct communication link
    one or more PQI values supported by a direct communication link
    one or more QFI values supported by a direct communication link
    mapping information between service types, PQIs, and QFIs supported by a direct communication link
    a communication mode
    the type of message The AS layer 205 may store information received from the SE layer 285, and may manage a sidelink radio bearer (SLRB) for direct communication. The method described in operation 406 may be applied to the relationship between the SLRB management, the SLRB, the QFI, and the PQI in a similar manner.

The AS layer 205 may configure a MAC header, based on the information received from the SE layer 285. The method described in operation 406 may be applied to the method of configuring the MAC header in a similar manner.

The AS layer 205 may configure the MAC header as described above, and may include a direct communication response message received from the SE layer 285 in the MAC payload, thereby transmitting the same to the terminal 110 through a physical layer 265 (operation 418).

The SE layer 280 of the terminal 110 receiving the direct communication response message may determine that the received message is a PC5-S signaling message, based on at least one of a destination layer-2 ID address of the received message, a logical channel ID (LCID), or information received from the AS layer (e.g., an indicator indicating a PC5-S signaling message), and may process the received message as follows. The SE layer 280 may identify that the received message is a direct communication response message, and inform the application layer 270 that the direct communication link has been established. At this time, the SE layer 280 of the terminal 110 may further inform the application layer 270 of information related to the established direct communication link (e.g., link ID, QFI, etc.).

An example of information that the SE layer 280 delivers to the application layer 270 is as follows.

direct communication link establishment complete indication
    a link ID indicating the direct communication
    QFIs supported by direct communication
    mapping information between QFIs and QoS requirements
    application data (in the case where data is received in operation 418)
    an application layer user ID of the terminal 110
    an application layer user ID of the terminal 120

In addition, the SE layer 280 may inform the AS layer 200 of information on the established direct communication link (e.g., a link ID, QFI information, and the like). An example of information that the SE layer 280 delivers to the AS layer 200 is shown below. The AS layer 200 may store the received information, and may use the same for direct communication in the future.

direct communication link establishment complete indication
    a link ID indicating direct communication
    QFIs supported by direct communication
    mapping information between QFIs and PQIs
    a layer-2 ID of the terminal 110
    a layer-2 ID of the terminal 120

The SE layer 280 may update the link profile information produced in operation 406, based on the information on the received direct communication response message. For example, the destination layer-2 ID of the direct communication response message received in operation 418 may be stored as a "layer-2 ID" of the terminal 120. In addition, if the information included in the direct communication response message received in operation 418 {e.g., an "application layer user ID" (application layer user identifier) of the terminal 120, "QoS requirements", "PQIs", "QFIs", and the like} does not match the link profile information produced in operation 406, the link profile information may be updated using the information received in operation 418.

FIG. 4B illustrates a procedure of transmitting data using a direct communication link according to an embodiment of the disclosure.

Referring to FIG. 4B, the terminal 110 and the terminal 120 may complete establishment of a direct communication link through the procedure described with reference to FIG. 4A. The terminals 110 and 120 may produce a link profile in the process of establishing the direct communication link, and may store layer-2 ID information on the terminals 110 and 120 to be used in the direct communication link.

In operation 421, the terminal 120 may determine a destination layer-2 ID for receiving data and a signaling message transmitted through the direct communication link produced through the procedure shown in FIG. 4A. For example, the destination layer-2 ID may be determined as the layer-2 ID of the terminal 120 included in the corresponding link profile.

The application layer 270 of the terminal 110 may deliver, to the SE layer 280, at least one of the "application data" produced by the application layer 270 in operation 424, a "link ID" indicating a direct communication link through which data is transmitted, a "service type" indicating the type of data, a "communication mode" indicating the communication method of data (e.g., broadcast, groupcast, unicast, or the like), an "application layer user ID" (application layer user identifier) of the transmitting terminal 110, an "application layer user ID" (application layer user identifier) of the receiving terminal 120, "QoS requirements" required for transmission of data, "PQIs" required for transmission of data, and "QFIs" required for transmission of data.

The SE layer 280 may identify link profile information associated with the link ID received in operation 424. The SE layer 280 may determine a source layer-2 ID and a destination layer-2 ID for transmitting the "application data" received in operation 424. For example, the source layer-2 ID may be determined using the layer-2 ID of the terminal 110 stored in the link profile associated with the link ID. The destination layer-2 ID may be determined using the layer-2 ID of the terminal 120 stored in the link profile associated with the link ID (operation 427).

The SE layer 280 may determine a QFI for transmitting the application data received in operation 424 (operation 427). For example, the SE layer 280 may use the QFI received in operation 424. Alternatively, the SE layer 280 may determine the QFI corresponding to the PQI received in operation 424. In order to determine the QFI corresponding to the PQI, the SE layer 280 may use information preset in the terminal or mapping information between PQIs and QFIs stored in the link profile associated with the link ID. Alternatively, the SE layer 280 may determine the QFI corresponding to the QoS requirements received in operation 424. In order to determine the QFI corresponding to the QoS requirements, the SE layer 280 may use information preset in the terminal or mapping information between the QoS requirements and QFIs stored in the link profile associated with the link ID.

The SE layer 280 may transmit, to the AS layer 200, at least one of the "application data" received in operation 424, the "source layer-2 ID" and the "destination layer-2 ID" determined in operation 427, the "QFI", the "link ID" related to the corresponding direct communication link, the communication mode (e.g., PC5 unicast), and the type of message {e.g., data (user plane) message}. An example of information that the SE layer 280 delivers to the AS layer 200 is as follows.

application data
  a link ID indicating direct communication
  QFIs required for direct communication
  PQIs required for direct communication
  mapping information between QFIs and PQIs required for direct communication
  a source layer-2 ID (i.e., the layer-2 ID of the terminal 110)
  a destination layer-2 ID (i.e., the layer-2 ID of the terminal 120)
  a communication mode
  the type of message The AS layer 200 may configure a MAC header, based on the information delivered from the SE layer 280. The method described in operation 406 may be applied to the method of configuring the MAC header in a similar way.

The source layer-2 ID of the MAC header may be set to the layer-2 ID of the terminal 110 received in operation 427. Alternatively, the source layer-2 ID of the MAC header may be set to the layer-2 ID of the terminal 110 mapped to the link ID stored by the AS layer 200 in the procedure in FIG. 4A based on the link ID received in operation 427.

The destination layer-2 ID of the MAC header may be set to the layer-2 ID of the terminal 120 received in operation 427. Alternatively, the destination layer-2 ID of the MAC header may be set to the layer-2 ID of the terminal 120 mapped to the link ID stored by the AS layer 200 in the procedure in FIG. 4A based on the link ID received in operation 427.

The AS layer 200 may determine the QFI for transmitting the application data received in operation 427. The QFI may be determined through a combination of the information received in operation 427 (e.g., the QFI) or the information received in operation 427 (e.g., the link ID) and the information stored by the AS layer 200 in the procedure in FIG. 4A.

The AS layer 200 may determine the LCID, based on the type of message (e.g., data) received in operation 427. The logical channel ID value used in the data message may be different from the logical channel ID value used in the signaling message. In addition, the LCID may be set to the value indicating the QFI through which the message is transmitted.

The SDAP header and/or the MAC header may include at least one of a value indicating the QFI for transmitting the message and a value indicating the link ID.

The AS layer 200 may configure the MAC header as described above, and may include the application data received from the SE layer 280 in the MAC payload, thereby transmitting the same to the terminal 120 through a physical layer 260 (operation 430).

The AS layer 205 of the terminal 120 receiving the "application data" may determine that the received message is a data message, based on the information included in the SDAP header and/or the MAC header of the received message (e.g., a logical channel ID and the like). The AS layer 205 may deliver the received message to the SE layer 285. The SE layer 285 may determine whether or not the received message is a message for the direct communication link produced according to the above-described procedure, based on the link ID, the destination layer-2 ID, and/or the QFI information of the received message.

In addition, the SE layer 285 of the terminal 120 may determine that the received message is a data message, based on the information received from the AS layer 205 (e.g., an SDAP header, an MAC header, or the like).

In addition, the SE layer 285 of the terminal 120 may determine the service type or the application ID of the received message, based on the link ID, the destination layer-2 ID, and/or the QFI information of the received message. Based on this, the SE layer 285 may deliver the received "application data" to the application 315 of the corresponding application layer 275 or to the service type included in the application (317 or 319). Alternatively, the SE layer 285 may deliver direct communication link information associated with the "application data" (e.g., a link ID, a service type, an application ID, and the like) to the application layer 275.

FIG. 4C illustrates a procedure of updating a direct communication link according to an embodiment of the disclosure.

Referring to FIG. 4C, the terminal 110 and the terminal 120 may complete establishment of a direct communication link through the procedure described with reference to FIG. 4A. The terminals 110 and 120 may produce a link profile in the process of establishing the direct communication link, and may store layer-2 ID information on the terminals 110 and 120 to be used in the direct communication link.

In operation 421, the terminal 120 may determine a destination layer-2 ID for receiving data and a signaling message transmitted through the direct communication link produced through the procedure shown in FIG. 4A. For example, the destination layer-2 ID may be set to the layer-2 ID of the terminal 120 included in the corresponding link profile.

The application layer 270 of the terminal 110 may deliver, to the SE layer 280, at least one of the "application data" produced by the application layer 270 in operation 433, "a link ID" indicating a direct communication link through which data is transmitted, a "service type" indicating the type of data, a "communication mode" indicating the communication method of data (e.g., broadcast, groupcast, unicast, or the like), an "application layer user ID" (application layer user identifier) of the transmitting terminal 110, an "application layer user ID" (application layer user identifier) of the receiving terminal 120, "QoS requirements" required for transmission of data, "PQIs" required for transmission of data, and "QFIs" required for transmission of data.

If there is a link profile including an application layer user ID of the transmitting terminal 110 and/or an application layer user ID of the receiving terminal 120 received from the application layer 270 in operation 433, the SE layer 280 may recognize that the terminal 110 has a pre-established direct communication link with the terminal 120. Accordingly, the SE layer 280 may determine to recycle the pre-established direct communication link, instead of establishing a new direct communication link, and may determine to perform the link update procedure shown in FIG. 4B (operation 436). According to an embodiment of the disclosure, in the case where one application layer user ID is used in one application, the terminal 110 may establish one direct communication link with the terminal 120 for each application. For example, one direct communication link may be produced for each application, and signaling and data for each application may be transmitted through one direct communication link. Alternatively, in the case where one application layer user ID is used in one or more applications, the terminal 110 may establish one direct communication link with the terminal 120 for the applications sharing the application layer user ID. For example, applications sharing one application layer user ID may share one direct communication link, and may transmit signaling and data for the applications through one direct communication link. Alternatively, in the case where one application layer user ID is used in all applications, one direct communication link may be established between the terminal 110 and the terminal 120, thereby transmitting signaling and data for all applications supported by the terminal 110 and the terminal 120 through the one direct communication link.

If there is no service type received in operation 433 in the link profile associated with the link ID, and/or if there is no PQI and/or QFI mapped to the QoS requirements in the link profile associated to the link ID, the SE layer 280 may determine to perform a link update procedure (operation 436).

The SE layer 280 may determine a new PQI and/or a new QFI that satisfies the QoS requirements received in operation 433 in a manner similar to the method described with reference to FIG. 4A.

The SE layer 280 may produce a link update request message. The link update request message may include at least one of the link ID, the new PQI and QFI determined by the SE layer 280, and mapping information between the PQI and the QFI.

In order to transmit the link update request message, the SE layer 280 may determine a source layer-2 ID and a destination layer-2 ID similar to the method described with reference to FIG. 2B.

The SE layer 280 may transmit, to the AS layer 200, at least one of a "link update request message", the "source layer-2 ID" and the "destination layer-2 ID" determined in operation 436, a "link ID" related to the corresponding direct communication link, a communication mode (e.g., PC5 unicast), and the type of message (e.g., a PC5-S signaling message). An example of information that the SE layer 280 delivers to the AS layer 200 is as follows.

a link update request message
a link ID indicating direct communication
an additional application ID required for direct communication
an additional QFIs required for direct communication
an additional PQIs required for direct communication
mapping information between the additional QFIs and the additional PQIs required for direct communication
a source layer-2 ID (i.e., the layer-2 ID of the terminal 110)
a destination layer-2 ID (i.e., the layer-2 ID of the terminal 120)
a communication mode
the type of message The AS layer 200 may configure a MAC header, based on the information delivered from the SE layer 280. The method described in operation 406 may be applied to the method of configuring the MAC header in a similar way.

The source layer-2 ID of the MAC header may be set to the layer-2 ID of the terminal 110 received in operation 436. Alternatively, the source layer-2 ID of the MAC header may be set to the layer-2 ID of the terminal 110 mapped to the link ID stored by the AS layer 200 in the procedure in FIG. 4A with reference to the link ID received in operation 427.

The destination layer-2 ID of the MAC header may be set to the layer-2 ID of the terminal 120 received in operation 436. Alternatively, the destination layer-2 ID of the MAC header may be set to the layer-2 ID of the terminal 120 mapped to the link ID stored by the AS layer 200 in the procedure in FIG. 4A with reference to the link ID received in operation 436.

The AS layer 200 may determine the LCID, based on the type of message (e.g., signaling) received in operation 436. The logical channel ID value used in the signaling message may be different from the logical channel ID value used in the data message.

The AS layer 200 may configure the MAC header as described above, and may include the link update request message received from the SE layer 280 in the MAC payload, thereby transmitting the same to the terminal 120 through a physical layer 260 (operation 439).

The terminal 120 receiving the link update request message may perform the link update corresponding to the link update request message (operation 442).

The AS layer 205 of the terminal 120 receiving the link update request message may determine that the received message is a signaling message, based on the logical channel ID of the MAC header of the received message. The AS layer 205 may deliver the received message to the SE layer 285. The SE layer 285 may determine whether or not the received message is a signaling message for the direct communication link produced according to the above-described procedure, based on the link ID, the destination layer-2 ID, and/or the QFI information of the received message.

In addition, the SE layer 285 of the terminal 120 may determine that the received message is a signaling message, based on the LCID of the message.

The SE layer 285 of the terminal 120 may store new QoS information (e.g., QoS requirements, PQIs, QFIs, etc.) included in the received message in the link profile associated with the link ID.

The SE layer 285 may deliver the changed QoS information to the application layer 275.

In addition, the SE layer 285 may deliver, to the AS layer 205, the link ID of the direct communication link and the changed QoS information in relation to the corresponding direct communication link. The AS layer 205 may store the received link ID, may update QoS information (e.g., the new PQI and the QFI corresponding thereto), and may use the same for direct communication in the future.

The AS layer (205) may transmit, to the terminal (110), a link update respond message including the changed QoS information received from the SE layer (285) (operation 445). The method described in operation 418 may be applied to the operation 445 in a similar manner.

FIG. 5A is a diagram illustrating producing a direct communication link according to an embodiment of the disclosure.

FIG. 5B is a diagram illustrating producing a direct communication link according to an embodiment of the disclosure.

FIG. 6A is a diagram illustrating QoS flow identifier (QFI) mapping in relation to a direct communication link according to an embodiment of the disclosure.

FIG. 6B a diagram illustrating QFI mapping in relation to a direct communication link according to an embodiment of the disclosure.

FIG. 7A is a diagram illustrating sidelink radio bearer (SLRB) mapping in relation to a direct communication link according to an embodiment of the disclosure.

FIG. 7B is a diagram illustrating sidelink radio bearer (SLRB) mapping in relation to a direct communication link according to an embodiment of the disclosure.

FIG. 8 is a diagram illustrating a configuration of a medium access control (MAC) protocol data unit (PDU) according to an embodiment of the disclosure.

FIG. 9 is a diagram illustrating a configuration of a sub-header of a sidelink-shared channel (SL-SCH) according to an embodiment of the disclosure.

Figure 10:
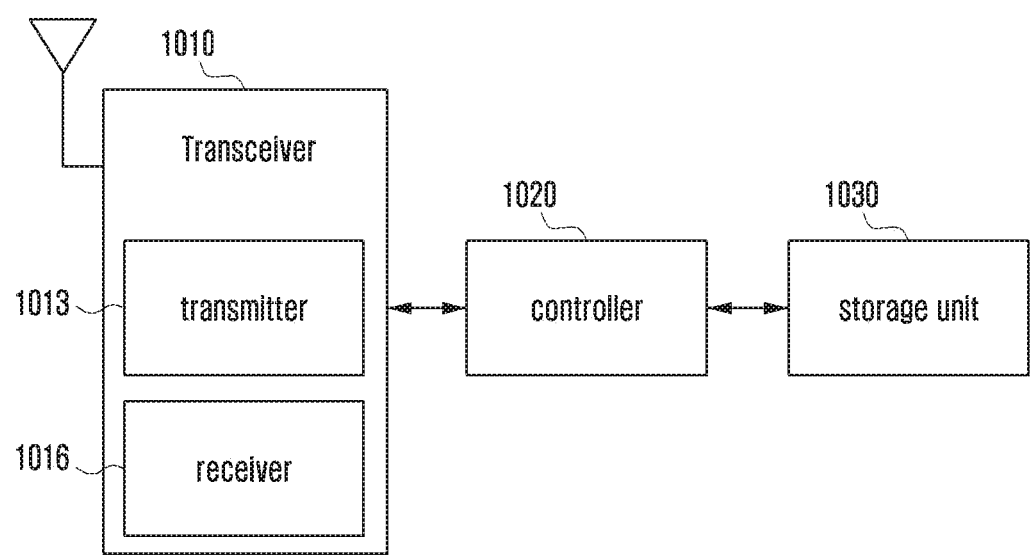
FIG. 10 is a block diagram illustrating a configuration of a network entity according to an embodiment of the disclosure.

FIG. 10 is a block diagram illustrating a configuration of a network entity according to an embodiment of the disclosure.

A communication system 130 may include a network entity according to an embodiment.

Referring to FIG. 10, a network entity may include a transceiver 1010, a controller 1020, and a storage unit 1030. The transceiver 1010, the controller 1020, and the storage unit 1030 of the network entity may operate according to the above-described communication method of the network entity. However, the configuration of the network entity is not limited to the above-described examples. For example, the network entity may include more or fewer components than the components described above. In addition, the transceiver 1010, the controller 1020, and the storage unit 1030 may be implemented into a single chip. Further, the controller 1020 may include at least one processor.

A receiver 1016 of the network entity and a transmitter 1013 of the network entity may be collectively called a "transceiver 1010", which may transmit and receive signals. The transmitted and received signals may include control information and data. To this end, the transceiver 1010 may include an RF transmitter for up-converting and amplifying the frequency of a transmitted signal, and an RF receiver for low-noise-amplifying a received signal and down-converting the frequency thereof. However, this is only an example of the transceiver 1010, and the components of the transceiver 1010 are not limited to the RF transmitter and the RF receiver.

In addition, the transceiver 1010 may receive a signal through a wireless channel to thus output the signal to the controller 1020, and may transmit a signal output from the controller 1020 through a wireless channel.

The storage unit 1030 may store programs and data necessary for the operation of the network entity. In addition, the storage unit 1030 may store control information or data included in the signal obtained from the network entity. The controller 1020 may include a storage medium, such as a read only memory (ROM), a random access memory (RAM), a hard disk, a compact disc-ROM (CD-ROM), and a digital versatile disc (DVD), or a combination of the storage media.

The controller 1020 may control a series of processes such that the network entity may operate according to the above-described embodiments. For example, the controller 1020 may receive a control signal and a data signal through the transceiver 1010, and may process the received control signal and data signal. In addition, the controller 1020 may transmit the processed control signal and data signal through the transceiver 1010.

Figure 11:
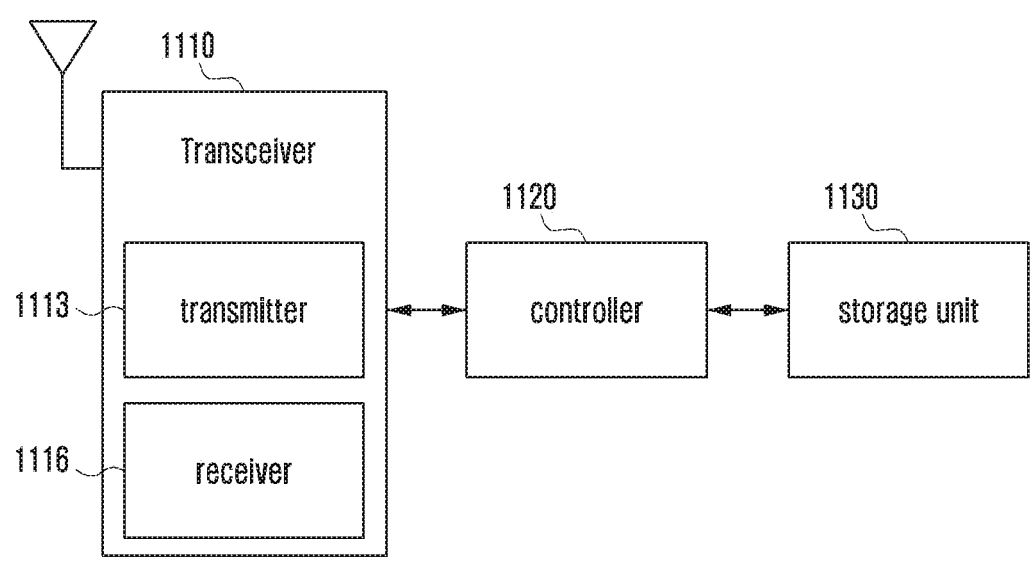
FIG. 11 is a block diagram illustrating a configuration of a terminal according to an embodiment of the disclosure.

FIG. 11 is a block diagram illustrating a configuration of a terminal according to an embodiment of the disclosure.

Referring to FIG. 11, a block diagram of the internal structure of the terminal 110, 115, 120, or 125 is illustrated. The terminal may include a transceiver 1110, a controller 1120, and a storage unit 1130.

The transceiver 1110, the controller 1120, and the storage unit 1130 of the terminal may operate according to the above-described communication method of the terminal. However, the configuration of the terminal is not limited to the above-described examples. For example, the terminal may include more or fewer components than the components described above. In addition, the transceiver 1110, the controller 1120, and the storage unit 1130 may be implemented into a single chip. Further, the controller 1120 may include at least one processor.

A receiver 1116 of the terminal and a transmitter 1113 of the terminal may be collectively called a "transceiver 1110", which may transmit and receive signals to and from a base station. The signals transmitted to and received from the base station may include control information and data. To this end, the transceiver 1110 may include an RF transmitter for up-converting and amplifying the frequency of a transmitted signal, and an RF receiver for low-noise-amplifying a received signal and down-converting the frequency thereof. However, this is only an example of the transceiver 1110, and the components of the transceiver 1110 are not limited to the RF transmitter and the RF receiver.

In addition, the transceiver 1110 may receive a signal through a wireless channel to thus output the signal to the controller 1120, and may transmit a signal output from the controller 1120 through a wireless channel.

The storage unit 1130 may store programs and data necessary for the operation of the terminal. In addition, the storage unit 1130 may store control information or data included in the signal obtained from the terminal. The controller 1120 may include a storage medium, such as a ROM, a RAM, a hard disk, a CD-ROM, and a DVD, or a combination of the storage media.

The controller 1120 may control a series of processes such that the terminal may operate according to the above-described embodiments. For example, the controller 1120 may receive a control signal and a data signal through the transceiver 1110, and may process the received control signal and data signal. In addition, the controller 1120 may transmit the processed control signal and data signal through the transceiver 1110.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. A method performed by a first terminal in a wireless communication system, the method comprising:
   establishing a unicast link with a second terminal for a first service of a first service type, wherein each of the first terminal and the second terminal has a plurality of application layer identifiers (IDs), the unicast link is associated with a first pair between an application layer ID of the first terminal and an application layer ID of the second terminal, and the unicast link supports a plurality of service types associated with the first pair;
   in case that a data transfer for a second service of a second service type is initiated, identifying whether a second pair of application layer IDs for supporting the second service type is identical to the first pair of application layer IDs;
   determining to reuse the established unicast link, based on the second pair of application layer IDs for supporting the second service type being identical to the first pair of application layer IDs; and
   modifying the established unicast link with the second terminal by adding the second service type to the established unicast link.

2. The method of claim 1, further comprising:
   assigning a link identifier for the unicast link, in case that the unicast link is established,
   wherein the unicast link is associated with a unicast link profile which includes the plurality of service types, the application layer IDs of the first terminal and the second terminal, Layer-2 IDs of the first terminal and the second terminal, and a quality of service (QoS) flow identifier (QFI) for each service type of the plurality of service types.

3. The method of claim 2, further comprising:
   delivering, by a service enabling (SE) layer, the link identifier and information on the unicast link to an access stratum (AS) layer, wherein the information on the unicast link includes Layer-2 ID information of the first terminal and the second terminal;
   maintaining, by the AS layer, the link identifier and the information on the unicast link to reuse the unicast link; and
   performing a data communication with the second terminal using the Layer-2 ID information via the unicast link.

4. The method of claim 3,
   wherein the modifying of the established unicast link comprises:
   transmitting a link modification request message to the second terminal,
   wherein the link modification request message includes information on the second service type and information on QoS flow for the second service type,
   wherein the unicast link profile is updated based on the link modification request message, and
   wherein the second service type is added to the established unicast link based on the link modification request message.

5. The method of claim 1, further comprising:
   establishing a new unicast link, in case that the second pair of application layer IDs associated with the second service type is different to the first pair of application layer IDs; and,
   performing a data communication for the second service via the new unicast link, based on the second pair of application layer IDs associated with the second service type being different to the first pair of application layer IDs.

6. A method performed by a second terminal in a wireless communication system, the method comprising:
   establishing a unicast link with a first terminal for a first service of a first service type, wherein each of the first terminal and the second terminal has a plurality of application layer identifiers (IDs), the unicast link is associated with a first pair between an application layer ID of the first terminal and an application layer ID of the second terminal, and the unicast link supports a plurality of service types associated with the first pair; and
   modifying the established unicast link to reuse the established unicast link for a second service of a second service type, in case that a data transfer for the second service is initiated,
   wherein the established unicast link is determined to be reused for the second service, based on a second pair of application layer IDs for supporting the second service type being identical to the first pair of application layer IDs, and
   wherein the established unicast link with the first terminal is modified by adding the second service type to the established unicast link.

7. The method of claim 6,
   wherein a link identifier is assigned for the unicast link, in case that the unicast link is established, and
   wherein the unicast link is associated with a unicast link profile which includes the plurality of service types, the application layer IDs of the first terminal and the second terminal, Layer-2 IDs of the first terminal and the second terminal, and a quality of service (QoS) flow identifier (QFI) for each service type of the plurality of service types.

8. The method of claim 7, further comprising:
   delivering, by a service enabling (SE) layer, the link identifier and information on the unicast link to an access stratum (AS) layer, wherein the information on the unicast link includes Layer-2 ID information of the first terminal and the second terminal;
   maintaining, by the AS layer, the link identifier and the information on the unicast link to reuse the unicast link; and
   performing a data communication with the first terminal using the Layer-2 ID information via the unicast link.

9. The method of claim 8,
   wherein the modifying of the established unicast link comprises:
   receiving a link modification request message from the first terminal,
   wherein the link modification request message includes information on the second service type and information on QoS flow for the second service type,
   wherein the unicast link profile is updated based on the link modification request message, and
   wherein the second service type is added to the established unicast link based on the link modification request message.

10. The method of claim 6, further comprising:
establishing a new unicast link, in case that the second pair of application layer IDs associated with the second service type is different to the first pair of application layer IDs; and,
performing a data communication for the second service via the new unicast link, based on the second pair of application layer IDs associated with the second service type being different to the first pair of application layer IDs.

11. A first terminal in a wireless communication system, the first terminal comprising:
a transceiver configured to transmit and receive signals; and
a controller coupled with the transceiver and configured to:
establish a unicast link with a second terminal for a first service of a first service type, wherein each of the first terminal and the second terminal has a plurality of application layer identifiers (IDs), the unicast link is associated with a first pair between an application layer ID of the first terminal and an application layer ID of the second terminal, and the unicast link supports a plurality of service types associated with the first pair,
in case that a data transfer for a second service of a second service type is initiated, identify whether a second pair of application layer IDs for supporting the second service type is identical to the first pair of application layer IDs,
determine to reuse the established unicast link, based on the second pair of application layer IDs for supporting the second service type being identical to the first pair of application layer IDs, and
modify the established unicast link with the second terminal by adding the second service type to the established unicast link.

12. The first terminal of claim 11,
wherein the controller is further configured to assign a link identifier for the unicast link, in case that the unicast link is established, and
wherein the unicast link is associated with a unicast link profile which includes the plurality of service types, the application layer IDs of the first terminal and the second terminal, Layer-2 IDs of the first terminal and the second terminal, and a quality of service (QoS) flow identifier (QFI) for each service type of the plurality of service types.

13. The first terminal of claim 12, wherein the controller is further configured to:
deliver, by a service enabling (SE) layer, the link identifier and information on the unicast link to an access stratum (AS) layer, wherein the information on the unicast link includes Layer-2 ID information of the first terminal and the second terminal,
maintain, by the AS layer, the link identifier and the information on the unicast link to reuse the unicast link, and
perform a data communication with the second terminal using the Layer-2 ID information via the unicast link.

14. The first terminal of claim 13,
wherein the controller is further configured to transmit a link modification request message to the second terminal,
wherein the link modification request message includes information on the second service type and information on QoS flow for the second service type,
wherein the unicast link profile is updated based on the link modification request message, and
wherein the second service type is added to the established unicast link based on the link modification request message.

15. The first terminal of claim 11, wherein the controller is further configured to:
establish a new unicast link, in case that the second pair of application layer IDs associated with the second service type is different to the first pair of application layer IDs, and
perform a data communication for the second service via the new unicast based on the second pair of application layer IDs associated with the second service type being different to the first pair of application layer IDs.

16. A second terminal in a wireless communication system, the second terminal comprising:
a transceiver configured to transmit and receive signals; and
a controller coupled with the transceiver and configured to:
establish a unicast link with a first terminal for a first service of a first service type, wherein each of the first terminal and the second terminal has a plurality of application layer identifiers (IDs), the unicast link is associated with a first pair between an application layer ID of the first terminal and an application layer ID of the second terminal, and the unicast link supports a plurality of service types associated with the first pair, and
modify the established unicast link to reuse the established unicast link for a second service of a second service type, in case that a data transfer for the second service is initiated,
wherein the established unicast link is determined to be reused for the second service, based on a second pair of application layer IDs for supporting the second service type being identical to the first pair of application layer IDs, and
wherein the established unicast link with the first terminal is modified by adding the second service type to the established unicast link.

17. The second terminal of claim 16,
wherein a link identifier is assigned for the unicast link, in case that the unicast link is established, and
wherein the unicast link is associated with a unicast link profile which includes the plurality of service types, the application layer IDs of the first terminal and the second terminal, Layer-2 IDs of the first terminal and the second terminal, and a quality of service (QoS) flow identifier (QFI) for each service type of the plurality of service types.

18. The second terminal of claim 17, wherein the controller is further configured to:
deliver, by a service enabling (SE) layer, the link identifier and information on the unicast link to an access stratum (AS) layer, wherein the information on the unicast link includes Layer-2 ID information of the first terminal and the second terminal,
maintain, by the AS layer, the link identifier and the information on the unicast link to reuse the unicast link, and
perform a data communication with the first terminal using the Layer-2 ID information via the unicast link.

19. The second terminal of claim 18,
wherein the controller is further configured to receive a link modification request message from the first terminal,
wherein the link modification request message includes information on the second service type and information on QoS flow for the second service type,
wherein the unicast link profile is updated based on the link modification request message, and
wherein the second service type is added to the unicast link based on the link modification request message.

20. The second terminal of claim 16, wherein the controller is further configured to:
establish a new unicast link, in case that the second pair of application layer IDs associated with the second service type is different to the first pair of application layer IDs, and
perform a data communication for the second service via the new unicast link, based on the second pair of application layer IDs associated with the second service type being different to the first pair of application layer IDs.

* * * * *